(12) United States Patent
Jager et al.

(10) Patent No.: US 7,753,194 B1
(45) Date of Patent: Jul. 13, 2010

(54) CONVEYOR ASSEMBLY

(75) Inventors: Todd Gerald Jager, Sioux City, IA (US); Tony Wayne Derrick, Sioux City, IA (US)

(73) Assignee: Industrial Design Fabrication & Installation, Inc., Moville, IA (US)

( * ) Notice: Subject to any disclaimer, the term of this patent is extended or adjusted under 35 U.S.C. 154(b) by 688 days.

(21) Appl. No.: 11/194,378

(22) Filed: Aug. 1, 2005

Related U.S. Application Data

(63) Continuation-in-part of application No. 29/214,149, filed on Sep. 28, 2004, now abandoned.

(51) Int. Cl.
- *B65G 15/60* (2006.01)
- *B65G 15/62* (2006.01)
- *B65G 17/06* (2006.01)

(52) U.S. Cl. .................. 198/861.1; 198/841; 198/860.1
(58) Field of Classification Search ................. 198/812, 198/816, 861.1
See application file for complete search history.

(56) References Cited

U.S. PATENT DOCUMENTS

| | | | |
|---|---|---|---|
| 3,181,686 A * | 5/1965 | Hurlburt | 198/369.5 |
| 3,820,650 A * | 6/1974 | Garvey | 198/860.1 |
| 3,848,732 A | 11/1974 | Catalano | |
| 3,985,070 A | 10/1976 | Longenecker et al. | |
| 4,015,517 A | 4/1977 | Pomara, Jr. | |
| 4,170,293 A | 10/1979 | Campbell | |
| 4,674,627 A | 6/1987 | Benlcio | |
| 4,989,723 A * | 2/1991 | Bode et al. | 198/635 |
| 5,119,926 A * | 6/1992 | Draebel et al. | 198/836.3 |
| 5,205,400 A * | 4/1993 | Breuss et al. | 198/812 |
| 5,316,134 A | 5/1994 | Donohue | |
| 5,320,210 A | 6/1994 | Van Den Bergh et al. | |
| D370,759 S | 6/1996 | Kubsik et al. | |
| 5,924,550 A | 7/1999 | Karpinsky | |
| D423,749 S | 4/2000 | Musil et al. | |
| 6,099,882 A | 8/2000 | Risner, Jr. et al. | |
| 6,112,884 A | 9/2000 | Voorhees | |
| 6,179,369 B1 * | 1/2001 | Bender et al. | 296/182.1 |
| 6,196,097 B1 | 3/2001 | Handel | |
| 6,227,355 B1 * | 5/2001 | White et al. | 198/841 |
| 6,371,283 B1 | 4/2002 | Manchester | |

(Continued)

FOREIGN PATENT DOCUMENTS

DE  33 32 190  3/1985

OTHER PUBLICATIONS

Stiffner Dies, Brake Formed Shapes; catalog p. 103; date unknown.

*Primary Examiner*—Gene Crawford
*Assistant Examiner*—Kavel P Singh
(74) *Attorney, Agent, or Firm*—Dorsey & Whitney LLP; Jason M. Hunt

(57) ABSTRACT

A conveyor assembly is provided. The conveyor assembly comprises a frame having structural support elements that facilitate easy cleaning of the device and avoid the collection of water, bacteria, debris and the like. The frame of the conveyor assembly may further comprise one or more means for retaining wear strips on the frame that provide for the secure retention of the wear strip, yet allow easy removal and cleaning of the associated components. A sanitary removable hinge is also disclosed and may be used in connection with a conveyor assembly.

23 Claims, 23 Drawing Sheets

U.S. PATENT DOCUMENTS

| | | |
|---|---|---|
| 6,422,382 B1 * | 7/2002 | Ertel et al. ............... 198/860.1 |
| 6,427,831 B1 * | 8/2002 | Norton ....................... 198/841 |
| D464,783 S | 10/2002 | Abbestam |
| D486,289 S | 2/2004 | Abbestam |
| 6,769,536 B2 * | 8/2004 | Lutz ........................ 198/861.1 |
| 2003/0154969 A1 * | 8/2003 | Carter ......................... 124/78 |

* cited by examiner

CONVEYOR ASSEMBLY

CROSS-REFERENCE TO RELATED APPLICATIONS

This application is a Continuation-in-Part of U.S. Design application No. 29/214,149, filed Sep. 28, 2004, which is hereby incorporated by reference.

FIELD OF THE INVENTION

The present invention relates to the art of conveyor assemblies and systems, and more particularly to conveyor systems which require routine cleaning, assembly and disassembly.

BACKGROUND OF THE INVENTION

The present invention relates to an easily cleaned conveyor assembly especially adapted for use in applications in which strict sanitary standards must be met, such as, but not limited to conveying food products. While the present invention will be particularly described with regard to conveyors for use in industries where cleaning and sanitary conditions are important, it will be apparent to those skilled in the art that the present invention has other applications where cleanliness or ease of cleaning, assembly, and disassembly are important.

Conveyor assemblies have been used for some time in various industries as a means of distribution of materials in manufacturing and processing of different products, ranging from boxes, to pharmaceuticals, to food products, to toys and many other products. For instance, in the food industry, it is common for conveyors to be used for the transport of products, such as, but no limited to, produce, meats, and other dry goods between various processing stations within a food processing facility.

Sanitation is a primary consideration in the food processing industry. Conveyors must be maintained in a clean and hygienic condition to meet basic sanitary standards. Cleaning of the conveyors is extremely costly as it requires a repeated outlay of money for soap, water, other chemicals, as well as downtime of the machines, and staff or cleaning crews to maintain a rigorous cleaning schedule. Much of the cost associated with maintaining clean, sanitary conveyors, is that current conveyor systems have numerous cracks, corners, screw holes, flat surfaces and other crevices where water, bacteria, mold, food waste, and unwanted materials can collect. In order to reach these areas, conveyor assemblies typically require the disassembly of various components, and may in fact include areas that are difficult, if not impossible, to access.

Different conveyor systems are commercially available. For instance, conveyors may operate manually or through a power source. As one example, gravity conveyors do not require a motor, but use wheels, rollers, and the pull of gravity to move materials along the conveyor. Power conveyors require a pneumatic or an electrical power source. In power conveyors, power is often transmitted from a drive system to a drive pulley, which is fastened to a drive shaft. The drive pulley transmits power to a conveyor belt, which moves the conveyor bed upon which materials to be transported rest.

In addition to the above, different conveyors include accumulating conveyors that allow for the collection of materials at a given point on the conveyor line; automated conveyors that perform conveying functions automatically; belt conveyors that utilize a belt to transport materials through the conveying system; chain conveyors that use parallel horizontal chains to move materials through a conveyor system; overhead conveyors that provide continuous movement of materials overhead; pallet conveyors that consist of portable platforms called pallets which move parts to different locations; roller conveyors that utilize round rotating parts called rollers to transport materials through the conveying system; and vertical conveyors that move materials up and down.

Generally, a conveyor assembly comprises one or more bearings, a bed upon which materials to be conveyed are placed, a belt that wraps around a conveyor pulley that transmits motion necessary for the movement of materials between two points, a drive and a drive pulley (when a power conveyor is used), a frame that provides the structural conveyor system support for the machinery that makes up the conveyor system, a pulley or wheel mechanism that controls movement, speed, and the direction of the conveyed materials, wear strips, and so forth.

The above description of conveyor systems and general assembly is presented for purposes of example only and is not intended to be an exhaustive list of conveyor systems or components. Despite the differences inherent in these different conveyor systems and components, each system suffers from the same difficulty in maintaining a clean, sanitary device.

Cleaning of conventional assemblies is made difficult because the assemblies often have curved, perforated components and include crevices, recesses and openings where dirt, bacteria and water can easily collect, but is difficult to remove. In many instances, bolts, clamps, or the like, are used to connect various components of the conveyor assembly. The interfaces between the bolts, clamps and the like and the holes that are required for same define environments where bacteria and dirt can easily collect or bacteria may grow.

Thus, conveyor assemblies currently available are difficult to clean, sterilize and maintain due to the numerous components that are attached together and the number of components that provide spaces for water and waste to collect and bacteria to grow. Accordingly, what is needed in the art is a sanitary conveyor assembly that provides minimal surface area for the collection of standing water, debris, and the like which provide surfaces on which bacteria may grow, and which is easy to clean.

SUMMARY OF THE INVENTION

The invention is embodied in a sanitary conveyor assembly. More preferably, the conveyor assembly of the present invention comprises a frame having structural support elements that facilitate easy cleaning of the device and avoid the collection of water, bacteria, debris and the like. The frame of the conveyor assembly may further comprise one or more means for retaining wear strips on the frame that provide for the secure retention of the wear strip, yet allow easy removal and cleaning of the associated components. A sanitary removable hinge is also provided and may be used in connection with a conveyor assembly.

Accordingly, it is a primary object of the present invention to provide a conveyor assembly that is easy to clean and maintain in a sanitary state, and is both effective and durable. It is a further object of the present invention to provide a conveyor assembly that contains minimal surface area upon which water, bacteria, mold, and other unwanted materials can collect. More specifically, the conveyor assembly comprises a device which is easy to clean, avoids the collection of standing water, and is easy to assemble/disassemble to facilitate cleaning. A further object of the present invention is to provide a sterile conveyor assembly that can be efficiently and effectively applied to convey food products and other products that require a sterile environment.

Other aspects, features and details of the present invention can be more completely understood by reference to the following detailed description in conjunction with the drawings, and from the appended claims.

DETAILED DESCRIPTION OF THE INVENTION

As described, the present invention is embodied in a sanitary conveyor assembly. The conveyor assembly comprises a frame having structural support elements that facilitate easy cleaning of the device and avoid the collection of water, bacteria, debris and the like. The frame of the conveyor assembly may further comprise one or more means for retaining wear strips on the frame that provide for the secure retention of the wear strip, yet allow easy removal and cleaning of the associated components. A sanitary removable hinge is also provided and may be used in connection with a conveyor assembly.

Figure 8:
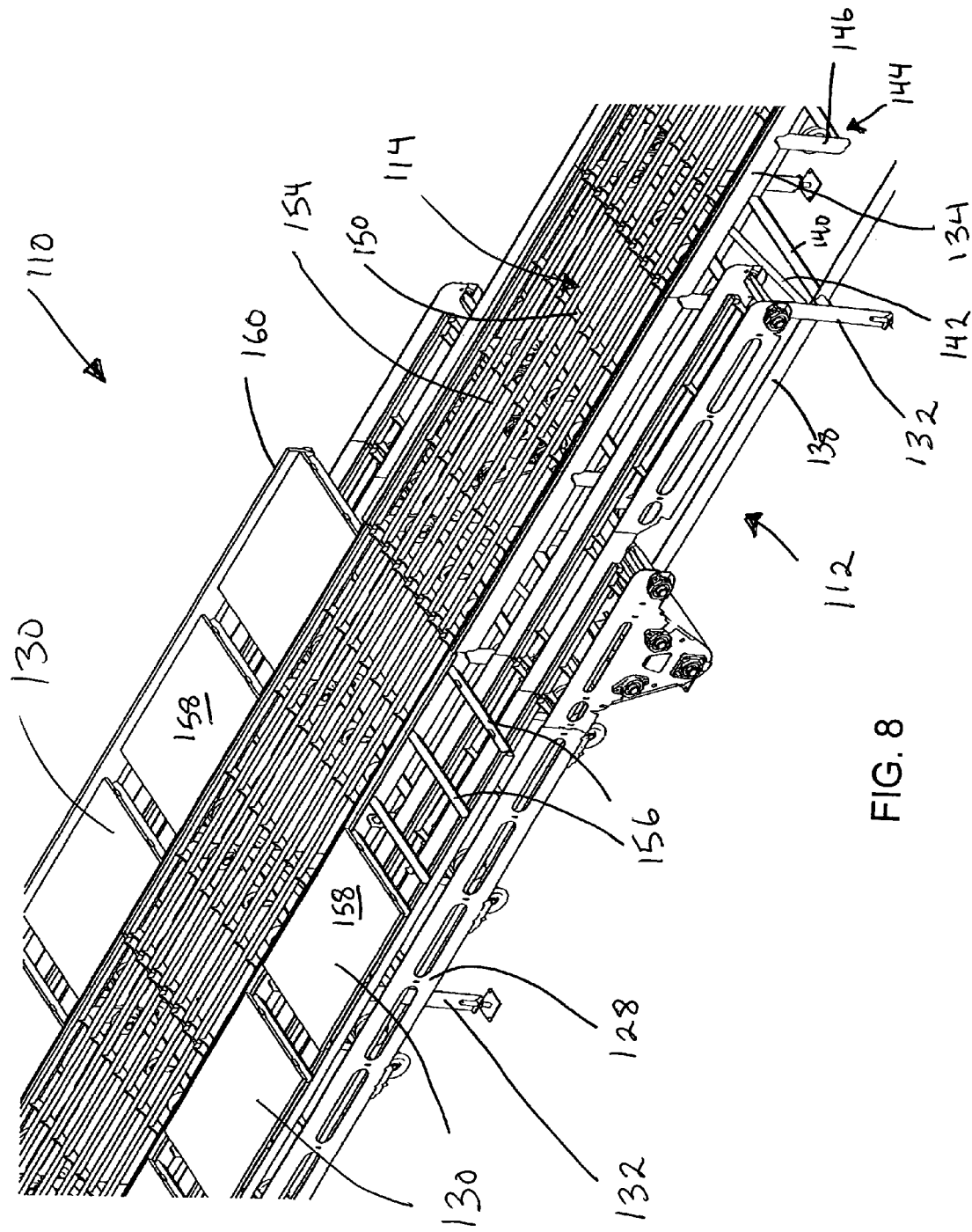
FIG. 8 is a cut-away perspective view of the conveyor assembly of FIG. 7.

Generally, a conveyor assembly 110 of the present invention may comprise an elongate conveyor frame 112 (see FIGS. 1, 8, & 9), a continuous conveyor belt (not shown) which moves along the frame, and guide rails 113 located on the frame for guiding the belt. The belt wraps around conventional return rollers 126 at either end of the frame 112 to provide an upper article moving run moving in one direction on the top of the frame and a lower return run located within the frame and running in the opposite direction. The conveyor belt may be of conventional design and could, for example, include a number of conveyor segments linked together, each segment having a relatively wide article support surface area. A conventional drive 118 may be provided to move the conveyor belt along the conveyor frame 112.

The elongate frame 112 may be made of a number of the elongate, stainless steel, extruded or laser cut segments joined together at the ends of the adjacent segments at tight vertical joints. While stainless steel is specifically disclosed, other materials suitable for conveyor components and readily available, and means for forming same may be used without departing from the overall scope of the invention. Apart from the specific attachments disclosed herein below, the attachment between respective joints, supports, and frame members may be by weld, adhesive, threaded attachment members, or any means commonly available for securely attaching the respective components together and suitable for the purposes provided herein.

It is to be understood that the unique features of the invention discussed herein may be applied to conventional conveyor systems known in the art and, apart from the specific features identified herein, individual conveyor components will not be discussed in further detail.

As can be seen in the Figures, a conveyor assembly having the properties of the present invention comprises a frame having a number of supports. The supports and conveyor components comprise a shape and orientation that provides a minimal surface area for the collection of standing water, bacteria and/or collection of other waste materials. For instance, as will be discussed in further detail below, the frame generally comprises supports having a curvature or channel along a portion thereof forming a surface area that is easily accessible to clean, does not permit the collection of water, yet provides structural rigidity to the assembly. Moreover, the present assembly, as can be seen in the Figures, provides minimal surface area upon which water may collect, further reducing the likelihood of bacteria or mold growth.

In detail, referring to FIGS. 1-11, the conveyor assembly 110 according to the present invention comprises a frame 112, a bed 114, carryway supports 116, a drive 118 with a drive motor 120 and drive pulley 122, an idler pulley 124, return rollers 126, side panels 128, and optionally may include workstations 130.

Figure 1:
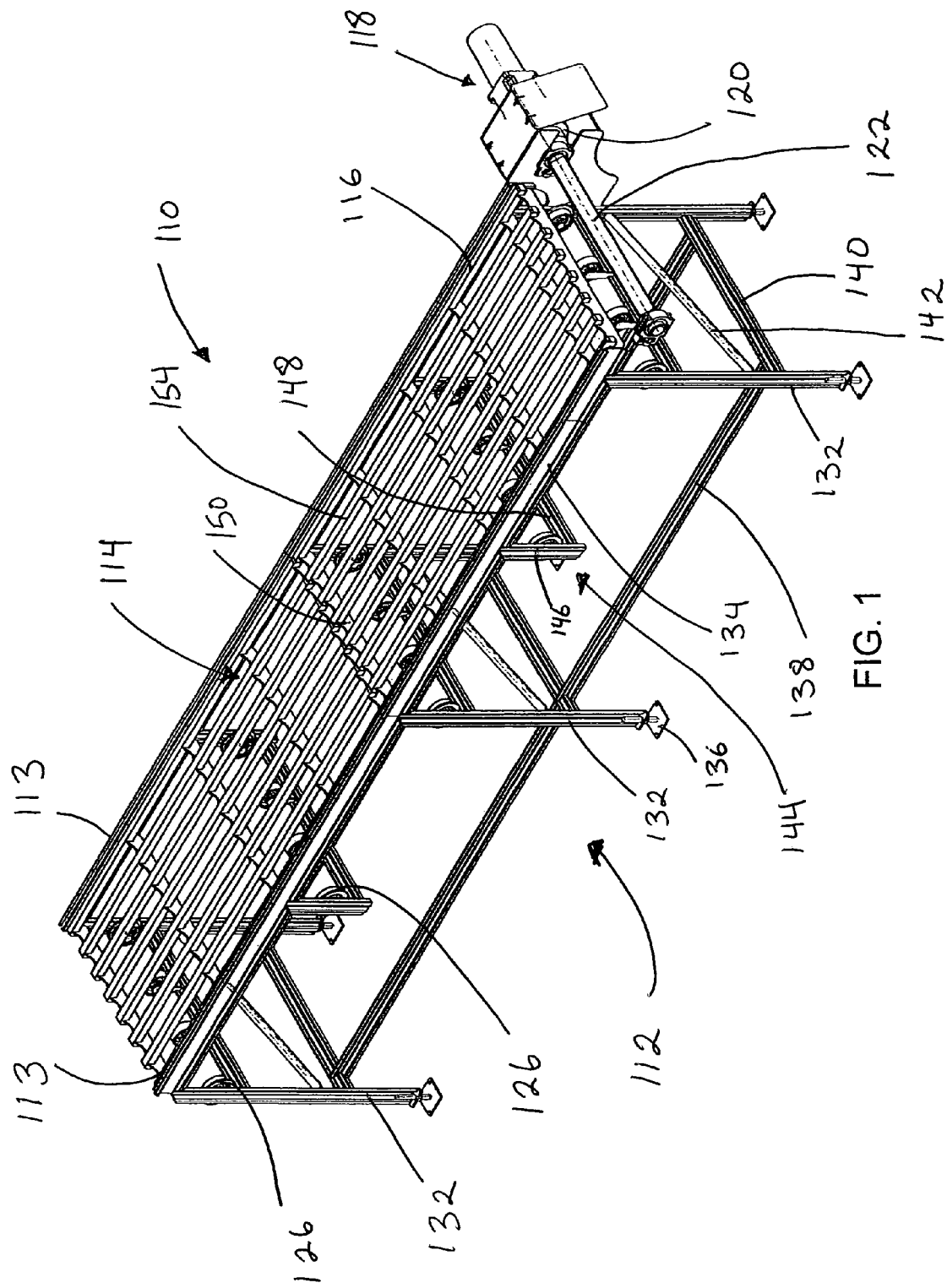
FIG. 1 is a perspective view of the conveyor assembly of the present invention.
Figure 2:
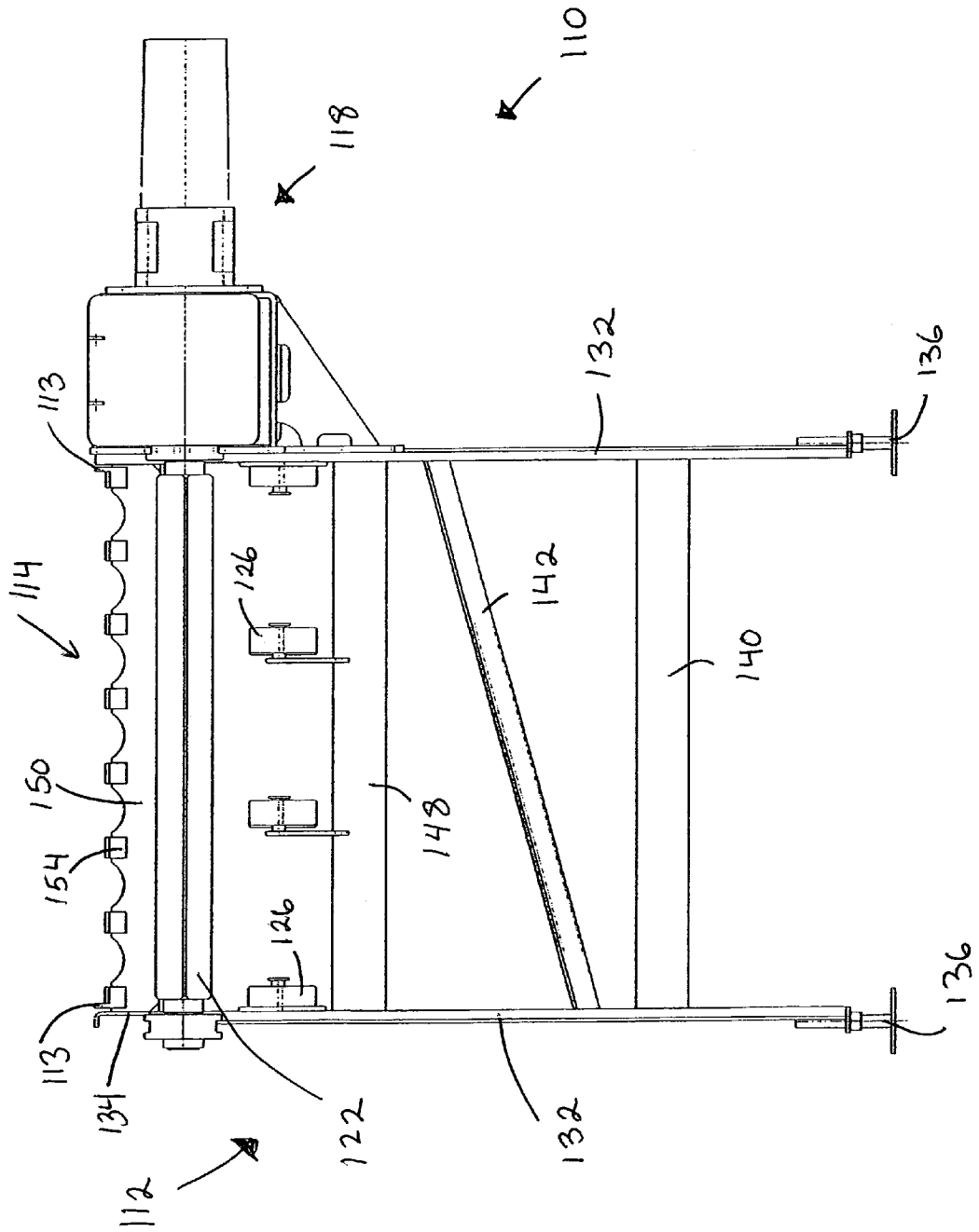
FIG. 2 is a front elevational view of the conveyor assembly of FIG. 1.
Figure 3:
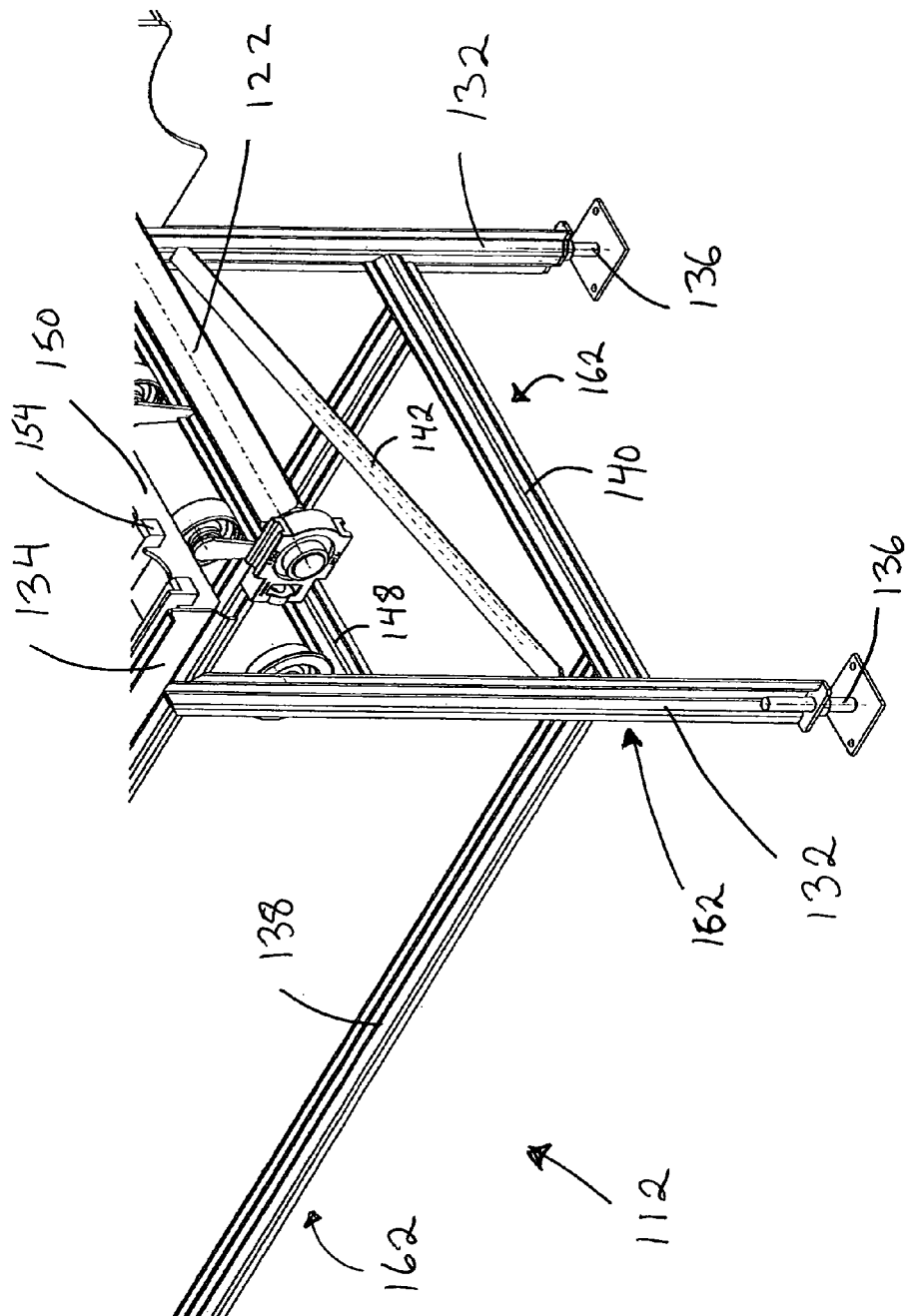
FIG. 3 is a cut-away view of the conveyor assembly supports of the present invention.
Figure 4:
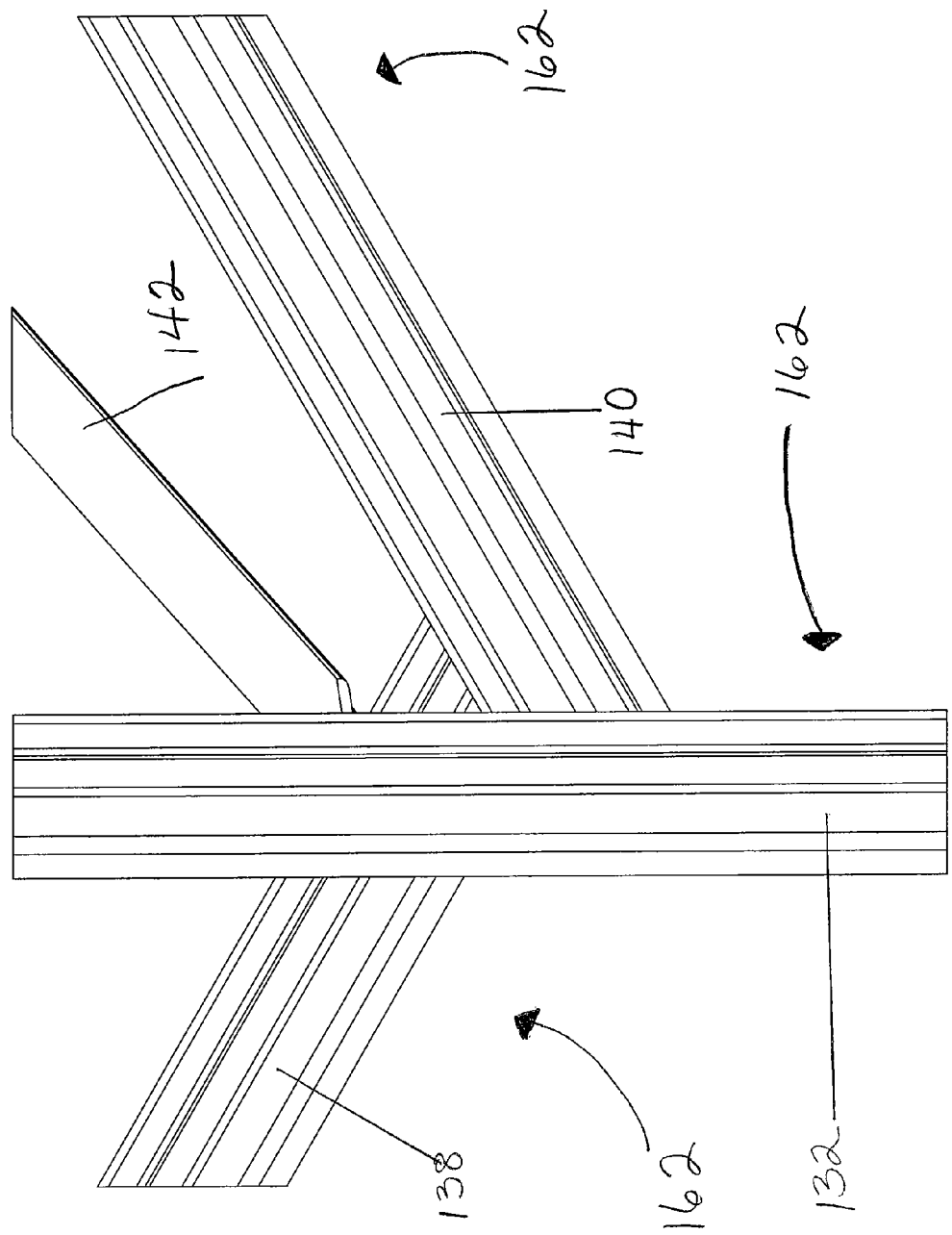
FIG. 4 is a cut-away view of the supports of FIG. 3.
Figure 5:
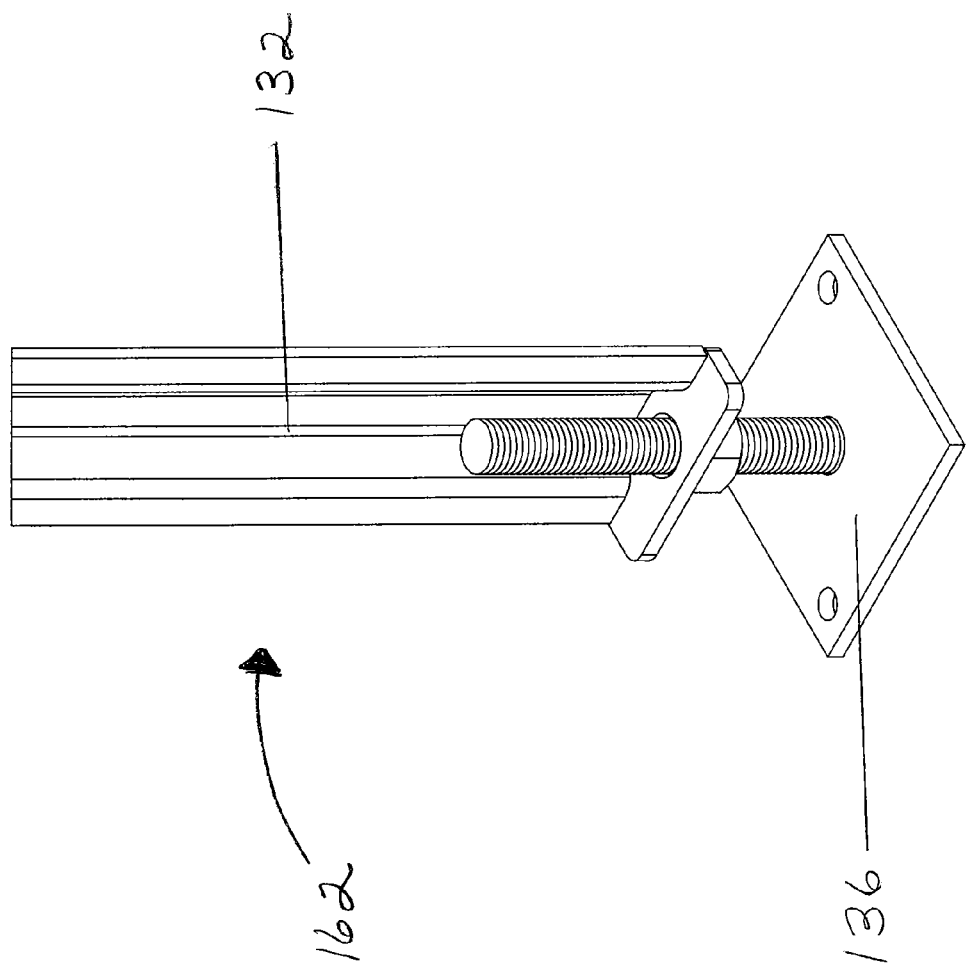
FIG. 5 is a cut-away perspective view a vertical support and adjustable foot of the present invention.

The conveyor frame 112 comprises a combination of one or more conveyor supports integrally connected or attached in various combinations. The frame 112 preferably comprises multiple components or supports. As can be seen in FIGS. 1 & 3, the frame 112 includes vertical supports 132 integrally attached to longitudinal rails 134, which rails are attached near the upper end of the vertical supports 132. Vertically adjustable feet 136 are position at the lower end of the vertical supports 132, and preferably form a screw-type connection with the lower end of the vertical supports 132 to allow for the individual adjustment of the height of the various vertical supports with attached feet (FIG. 5).

Referring to FIGS. 1, 3, 4, 9, also attached integrally with the frame are lower longitudinal supports 138, 140, which comprise a first longitudinal support 138 extending in the longitudinal direction of the frame assembly 112 substantially between a first vertical support 132 and a second vertical support 132, and a second longitudinal support 140 positioned perpendicular to the first longitudinal support 138 and extending between vertical supports 132 positioned on each side of the frame 112. These longitudinal supports 138, 140 may be attached to each other and/or attached to the vertical supports 132. For additional structural support, an angular crossbar 142 may be positioned between vertical supports 132. In one embodiment, the frame 112 may also comprise one or more intermediate return roller supports 144 comprising vertical intermediate supports 146 extending a distance below, and attached to the longitudinal rails 134. The vertical intermediate supports 146 are connected at their lower ends by a roller support 148, to which at least one return roller 126 is preferably attached. However, multiple return rollers 126 may be attached to at least a portion of the roller support 148.

As can be seen in FIGS. 1, 6, 8, & 15, the frame 112, at the top thereof and between the longitudinal rails 134, comprises one or more cross members 150. These cross members 150 comprise one or more grooves 152 for receiving a wear strip 154. In a preferred embodiment, a series of cross members 150 are provided spaced apart along the longitudinal direction of the conveyor assembly 110. The grooves 152 of each cross member 150 are positioned in a parallel relation so that a wear strip of a length greater than or equal to the distance between two or more cross members 150 may be supported thereon. Preferably, a plurality of grooves 152 are provided in a spaced apart manner along the length of the cross member 150. As a result, a plurality of wear strips 154 are supported in parallel relation, running in a longitudinal direction along the length of the conveyor assembly 110.

In an alternative embodiment, as shown in FIGS. 7-11, the conveyor assembly may further comprise workstations 130. These workstations preferably comprise one or more perpendicular workstation supports 156 extending in a substantially perpendicular direction to the longitudinal rails 134. A plurality perpendicular workstation supports 156 are provided in spaced relation along a length of the longitudinal rails 134 to provide sufficient support for a work area. Positioned on top of the workstation supports 156, may be workstation platforms 158. Guard rails 160 may also be provided along a length of the workstation 130.

The above description is presented merely for purposes of describing the preferred embodiments of the present invention and those of skill in the art would understand that various additional features common in conveyor assemblies and systems could be added to the description herein without departing from the overall scope of the invention. For instance, additional conveyor assembly components, including pulleys, rails, wear strips, supports and other relevant features may be attached to the conveyor assembly 110 at various points in the assemblies described without departing from the overall scope of the present invention.

Referring specifically to the various supports which comprise the frame 112 of the conveyor assembly of the present invention, the supports are provided with a shape and are integrally attached in relation and orientation to provide structural support to the conveyor bed. Each component is welded, extruded or otherwise attached so as to avoid flat edges. Namely smooth/coped-in edges form the various connections between support components and are used to link the various supports and other components of the present invention.

Figure 12:
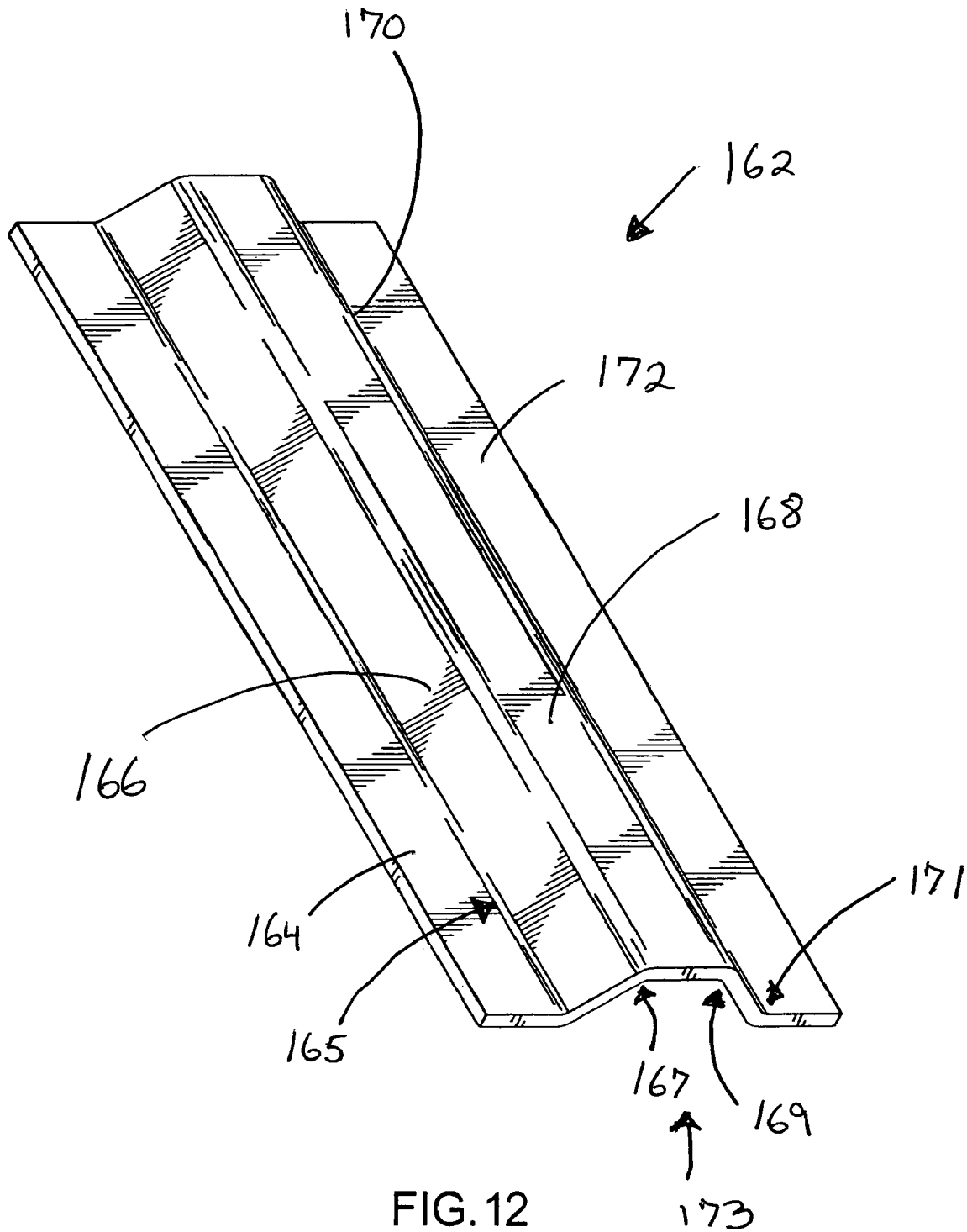
FIG. 12 is a perspective view of an embodiment of the first support of the present invention.

In a preferred embodiment, the conveyor supports comprise three alternative support arrangements discussed in further detail below. As shown in FIG. 12, a first support 162 comprises a uniform support member having a first section 164, a second section 166 integrally connected to the first section and positioned at a first angle 165 from the first section (preferably an angle greater than 90°), a third section 168 integrally connected to the second section 166 and positioned at a second angle 167 from the second section (preferably an angle greater than 90°) so that the third section is in a plane substantially parallel to the first section, a fourth section 170 integrally connected to the third section 168 and positioned at a third angle 169 from the third section opposite the second angle 167, and a fifth section 172 integrally attached to the fourth section 170 and positioned at a fourth angle 171 from a fourth section (preferably an angle greater than 90°) so that the fifth section is in substantially the same plane as the first section 164. The combination of the first section 164, second section 166, third section 168, fourth section 170, fifth section 172, and corresponding angles 165, 167, 169, 171 form a support having a centralized channel 173 that is easy to access for cleaning. Generally, the first support 162 comprises rounded edges at each of the respective angles so that smooth or substantially smooth surfaces exist thereon to avoid the collection of water, debris, bacteria and the like in crevices formed by corners and to permit easy cleaning within the respective angles. In sum, the first support 162 comprises a cross-section having a substantial U-shape with outturned ends. While the shape is specifically described with respect to the preferred embodiment, one of skill in the art would understand that additional sections and angles may be added or removed without departing from the overall scope of the present invention.

Figure 13:
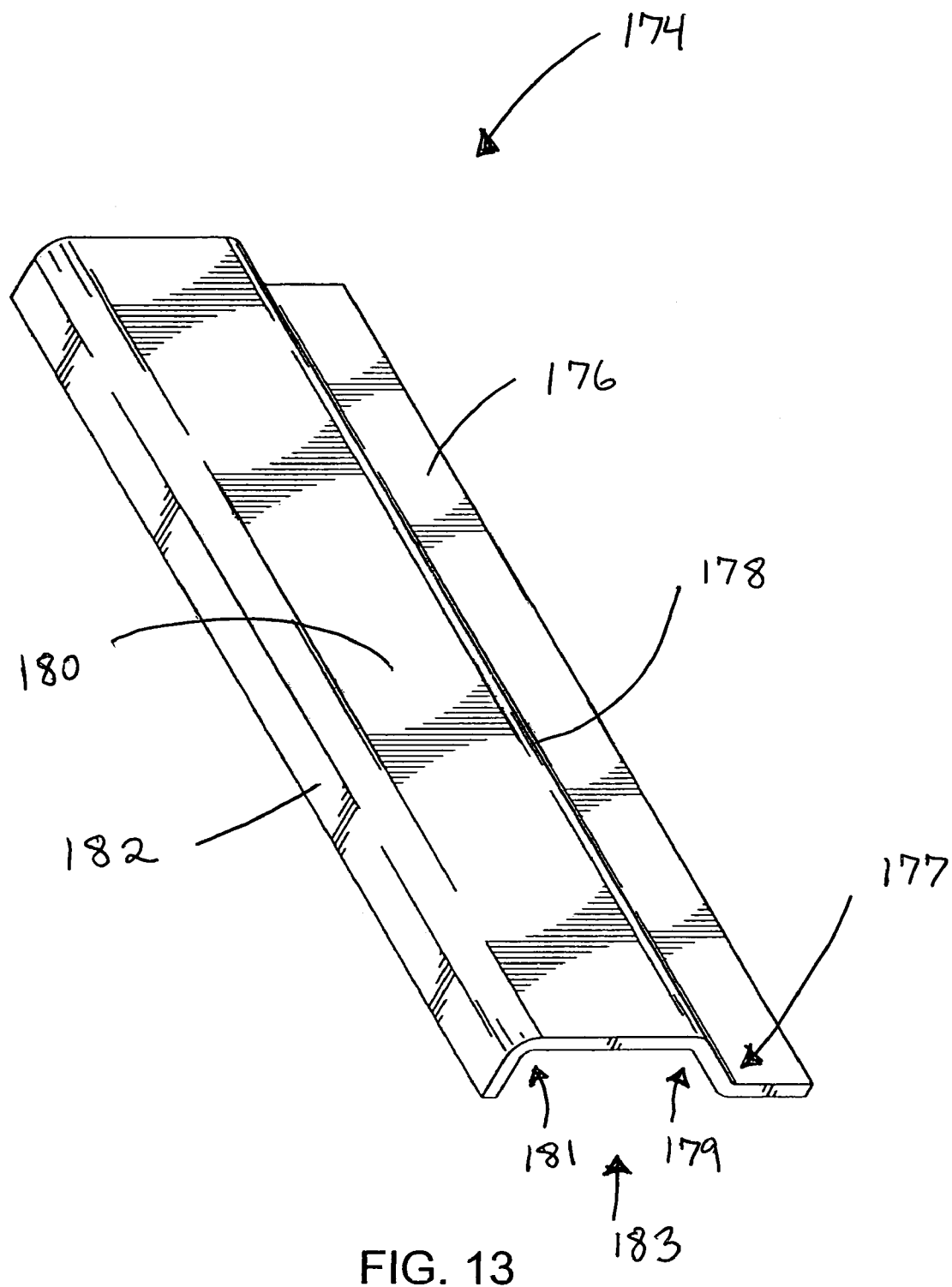
FIG. 13 is a perspective view of an embodiment of the second support of the present invention.

Referring to FIG. 13, the second support 174 comprises a uniform support member having a first section 176, a second section 178 integrally connected with the first section 176 and positioned at a first angle 177 (preferably an angle greater than 90°) from the first section, a third section 180 integrally attached to the second section 178 and positioned at a second angle 179 (preferably an angle greater than 90°) from the second section so that the third section is substantially parallel to the plane of the first section, and a fourth section 182 integrally attached to the third section 180 and positioned at an approximate, but rounded, 90° angle 181 from the fourth section. The combination of the second section 178, third section 180, and fourth section 182 and their respective angles 177, 179, 181 forms a support having a channel 183 on a portion thereof that permits ease of cleaning, yet retains structural rigidity or support. Moreover, in a preferred embodiment, the third section 180 is wider than the first section 176, (although any variation in size of the various components, channel 183, or sections would not depart from the overall scope of the invention) which permits various components of the conveyor assembly to be attached within the channel 183 (see FIG. 6). As with the first support 162, the angles of the second support 174 comprise rounded or smooth edges, avoiding cracks, crevices, and other areas where water, debris, bacteria and the like may collect, and at the same time permitting ease of cleaning. In a preferred embodiment, a cross-section of the second support 174 resembles a "question mark." However, as indicated, additional sections, shapes, and angles may be added to this support or removed without departing from the overall scope or purposes of the present invention.

Figure 14:
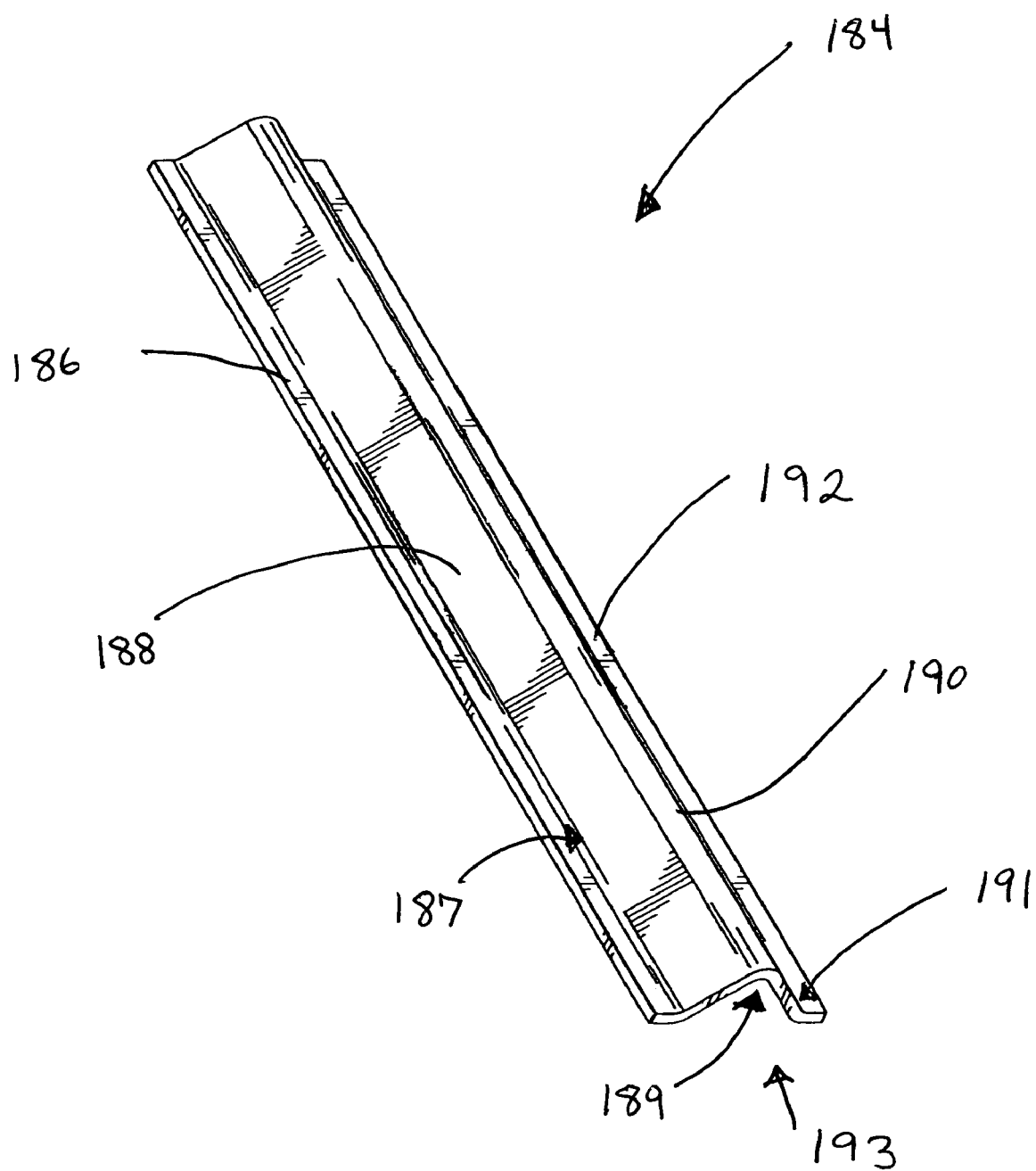
FIG. 14 is a perspective view of an embodiment of the third support of the present invention.

Referring to FIG. 14, the third support 184 comprises a uniform support member having a first section 186, a second section 188 integrally attached to the first section 186 and positioned at a first angle 187 (preferably an angle of greater than 90°) from the first section, a third section 190 integrally attached to the second section 188 and positioned at a second angle 189 from the second section (preferably a rounded angle of 90° or less), and a fourth section 192 integrally attached to the third section 190 and positioned at a third angle 191 from the third section opposite to the first angle 187 so that the first section and the fourth section are positioned on substantially the same plane. The combination of the first section 186, second section 188, third section 190, fourth section 192 and corresponding angles 187, 189, 191 forms a support having a centralized third channel 193 that is easy to access for cleaning. In sum, the third support 184 comprises a cross-section having a substantial V-shape with outturned ends. Similar to the first 162 and second 174 supports discussed above, the third support 184 comprises rounded or smooth edges so as to avoid cracks, crevices and other areas where water, debris, bacteria and the like may collect, and to permit easy cleaning of same within the channel. Additional shapes, sections, and angles may be added to this support member or removed without departing from the overall scope of the present invention.

Unique to the present invention, the above described supports 162, 174, and 184 are integrally connected and positioned on, or make up the frame 112 of the conveyor assembly 110 of the present invention (See FIGS. 1, 3-6, 9-11). While a specific arrangement of such conveyor supports is disclosed herein, any one support 162, 174, 184 may be substituted for another without parting from the overall scope of the present invention. As can be seen from the Figures, the vertical supports 132, the longitudinal rails 134, the lower longitudinal supports 138, 140, the intermediate return roller supports 144, the perpendicular workstation supports 156, and so forth may comprise one or more of the first, second, or third supports 162, 174 and 184. Moreover, these supports are positioned in a manner that prevents the collection or retention of water, waste, bacteria and other debris and are easy to clean by allowing access within the respective channels 173, 183, 193. In comparison, commonly available supports often comprise a tubular form or sharp 90° or more acute angles that have areas which are difficult to reach for cleaning.

Referring to FIG. 3, contrary to the typical, commonly available supports, the present invention, for instance, comprises vertical supports 132 and other supports of the frame 112 positioned in a substantially vertical orientation so that the channel 173 of the support 132, which in the embodiment disclosed comprises the first support 162, forms a vertical channel within which water and waste may drop vertically under the force of gravity. Moreover, the shape of this channel 173 and its location on the assembly 110 allows easy access to clean and sanitize each individual structural support component. More specifically, a user may fit a hand, finger or cleaning device into the channel 173 and reach all surfaces to thoroughly clean the support. In comparison, a conveyor assembly having vertical supports which are tubular or consists of hard right or acute angles results in spaces and crevices that cannot be reached or cleaned by any individual or device.

Figure 6:
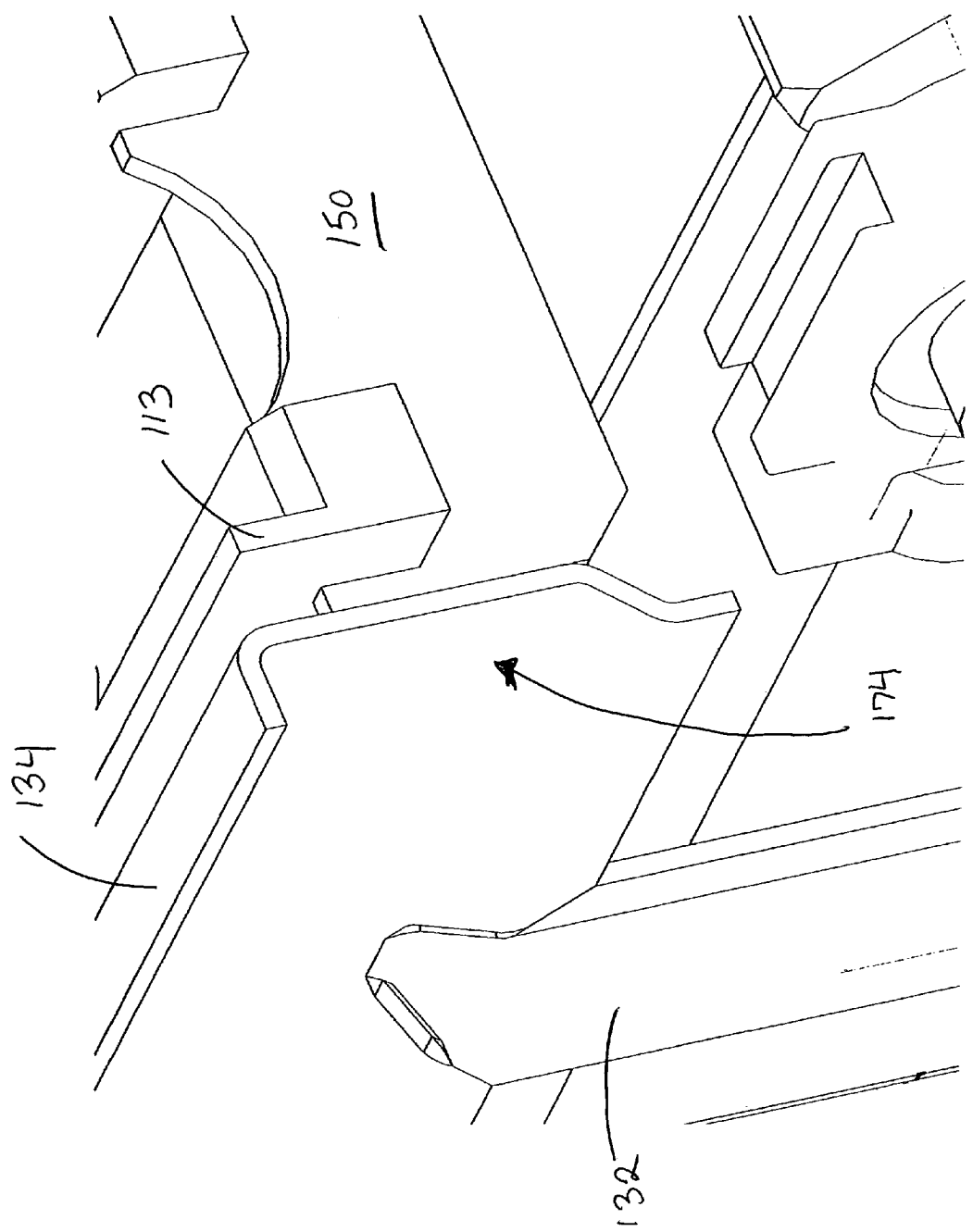
FIG. 6 is a cut-away perspective view of the longitudinal support rail and cross member in an embodiment of the present invention.
Figure 7:
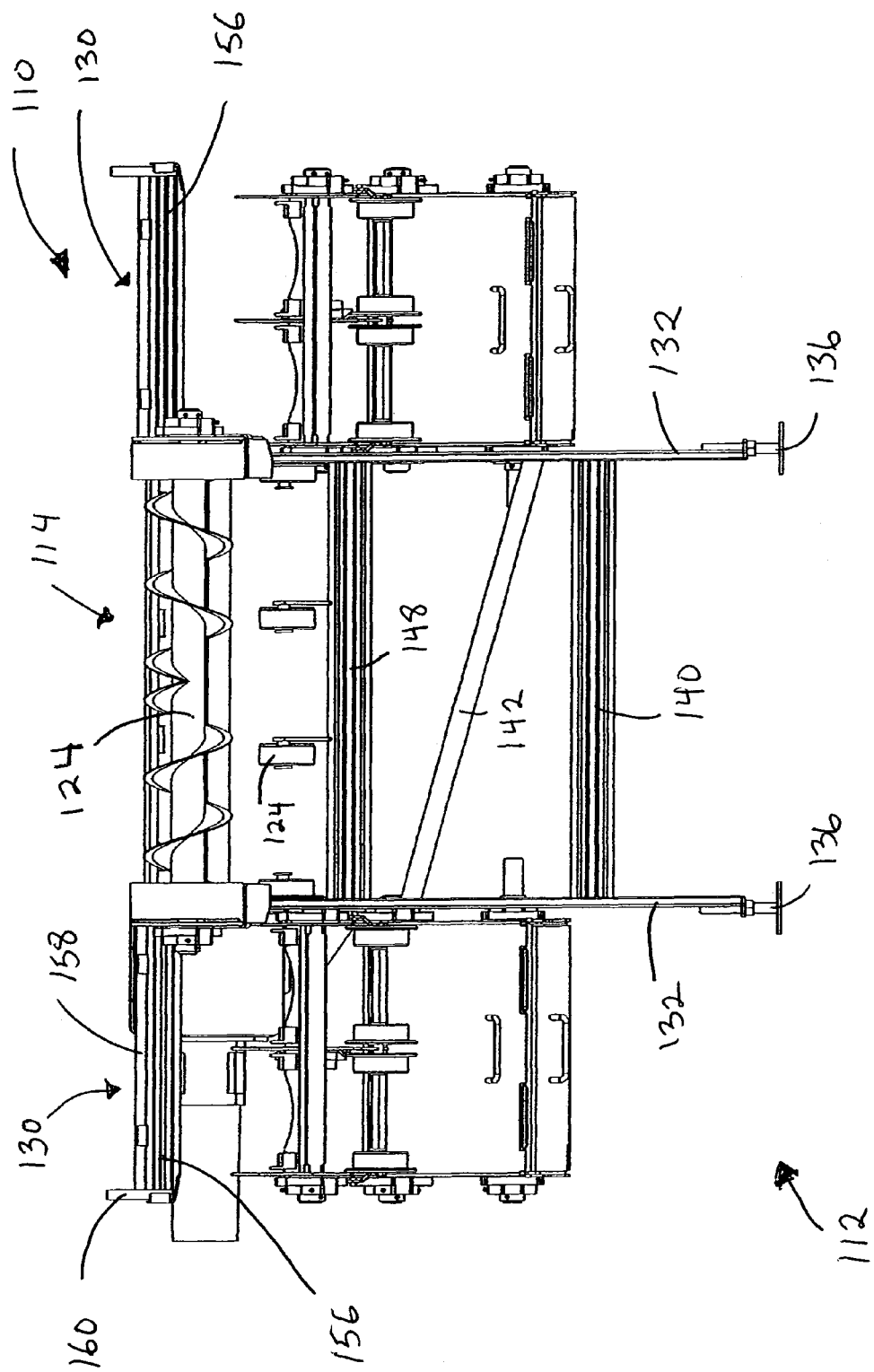
FIG. 7 is a front elevational view of an alternate embodiment of the conveyor assembly of the present invention, having a workstation thereon.
Figure 9:
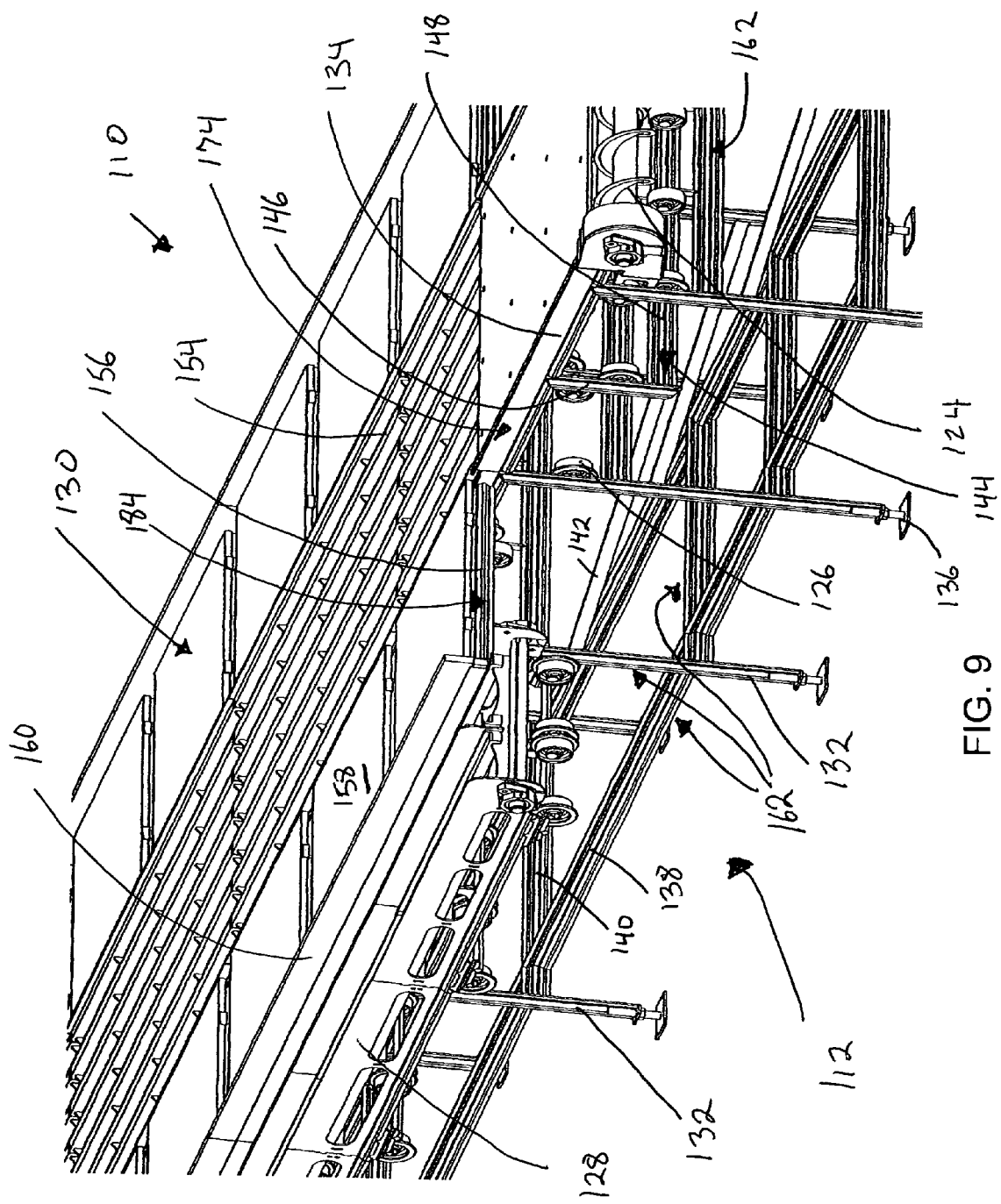
FIG. 9 is a cut-away perspective view of the conveyor assembly of FIG. 7 and FIG. 8.

Similarly, as shown in FIGS. 6 & 9 the longitudinal rails 134 of the embodiment shown comprise the second support 174 and are positioned so that the fourth section 182 is at the top thereof and extends outwardly in a substantially horizontal direction away from the conveyor. In this position, it is easy to clean within the channel 183 as described above. Further, apart from the top of the fourth section 182, which is easily accessible by the user for cleaning, no flat surfaces exist in which water, bacteria, debris or the like can collect. In addition, within the channel 183, different conveyor components may be attached as shown.

Figure 10:
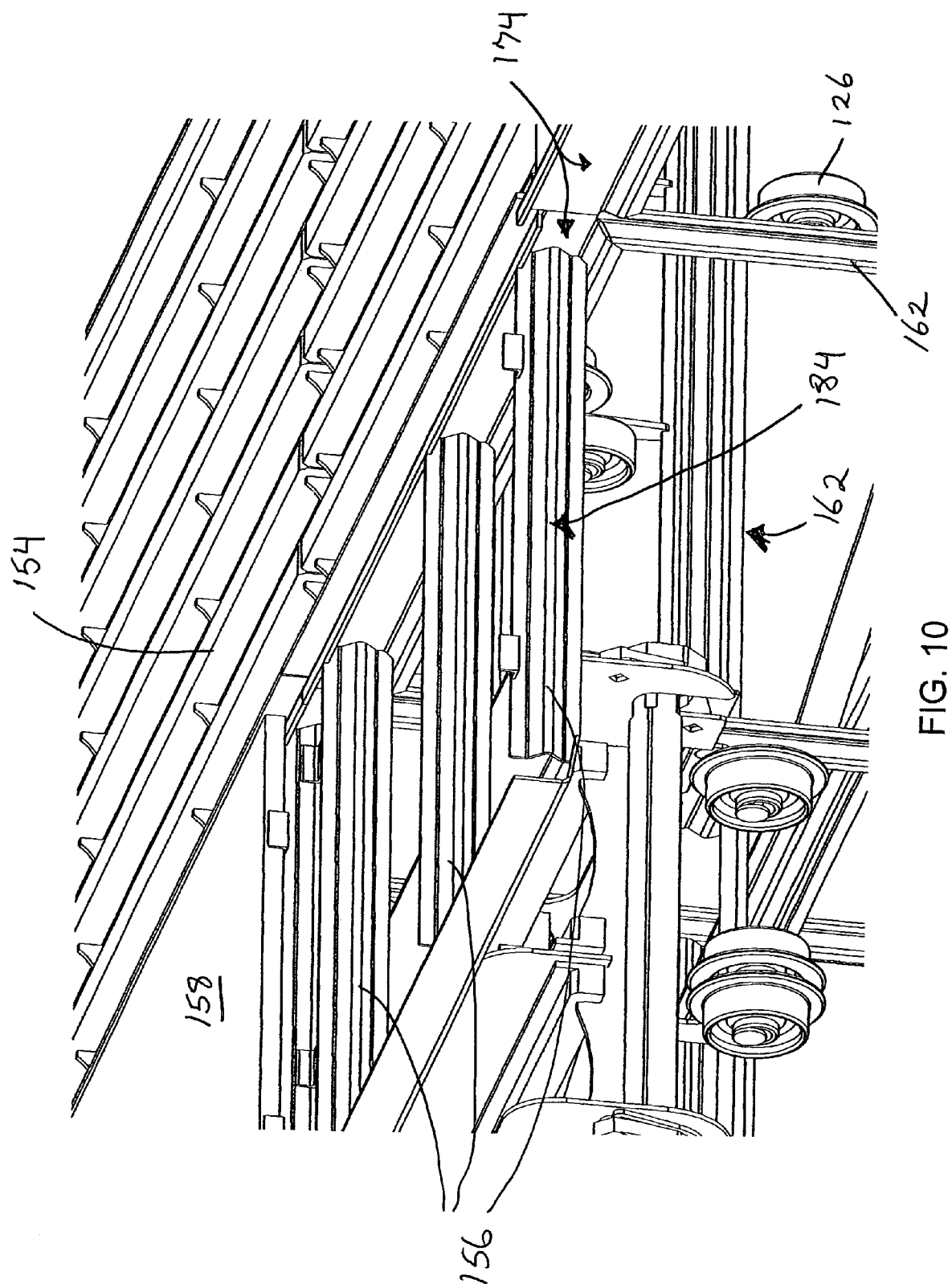
FIG. 10 is a cut-away perspective view of the conveyor assembly of FIGS. 7-9, showing an alternate embodiment of the perpendicular workstation supports of the present invention.
Figure 11:
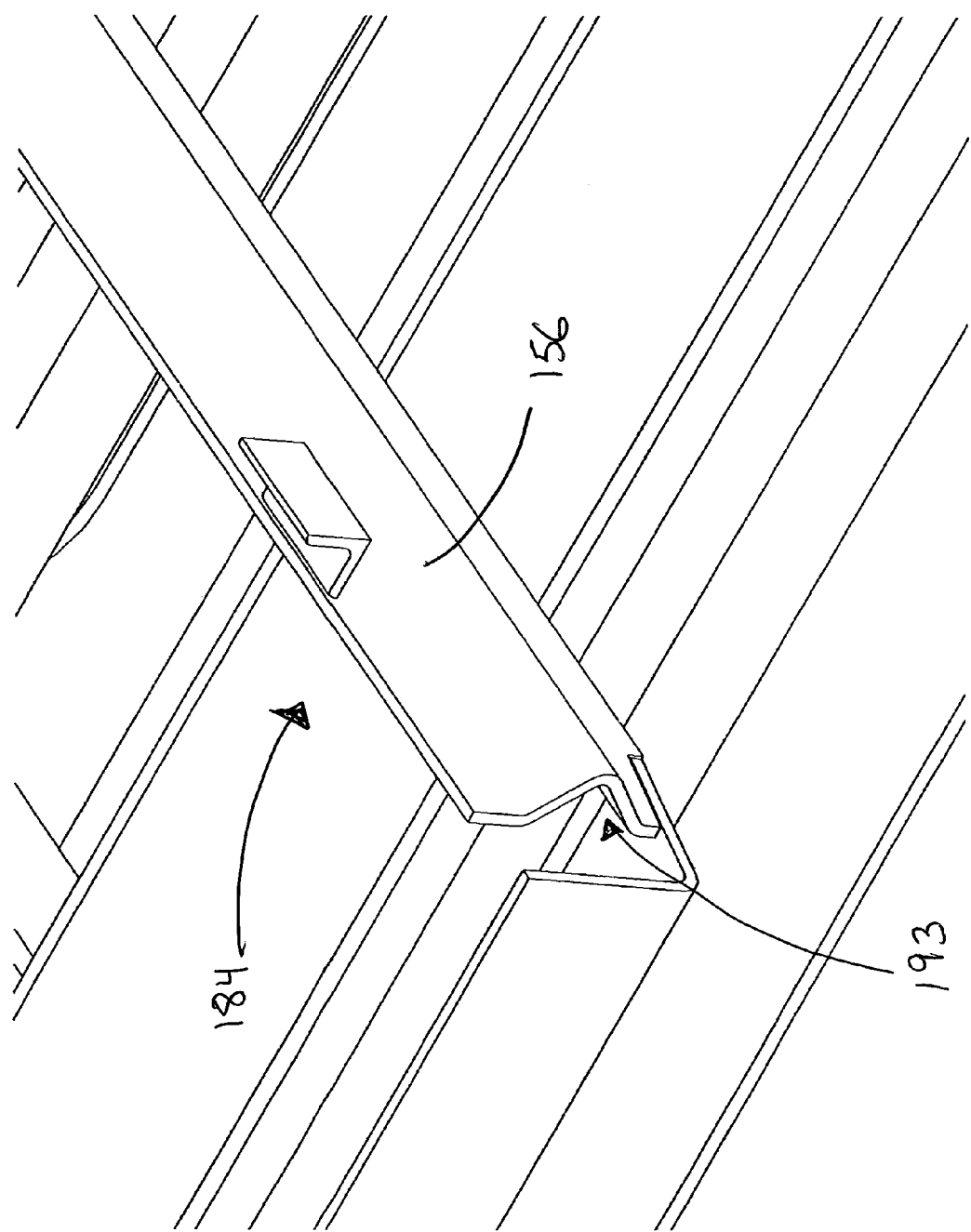
FIG. 11 is a cut-away perspective view of the perpendicular workstation support of FIG. 10.

The various longitudinal supports 138 and 140, as well as the perpendicular workstation supports 156, and other frame 112 supports may similarly comprise, in the embodiment shown, the third support 184 and are positioned so that the first section 186 and the fourth section 192 of the third support 184 are substantially vertical (See FIGS. 10-11). The channel 193, similar to the above, is easily accessible by the user and/or cleaning device to maintain the support in a sanitary condition. Further, due to the lack of sharp angles or enclosures, and the vertical or angled position of the support sections 186, 188, 190, 192, water and debris are not retained on the supports, avoiding the growth of bacteria, mold and the like. Likewise, the supports do not have crevices and concealed areas for the collection of water, debris, bacteria and the like as is common in tubular or hard angled support components commercially available and used today.

As indicated above, the support components are integrally attached and coped-in or smoothed at each connection point between the respective support components. As a result, surfaces in which water, waste, bacteria and other debris can collect are avoided. Further, while specific orientations and locations of the supports 162, 174, 184 are provided, these supports and orientations may be interchanged or substituted with one or more of the supports of the frame 112 disclosed to accomplish the purposes provided herein, including but not limited to a means for preventing the collection of water, debris, bacteria and the like on the structural components of the frame 112, and to facilitate the ease of cleaning same. Likewise, one of skill in the art would understand that the supports 162, 174, 184 may be substituted for or modified to fit other components of the conveyor assembly where cleanliness and sanitary conditions are desired.

A method of cleaning the frame 112 and corresponding supports of the conveyor assembly 110 of the present invention may comprise removal of any attached components and the application of cleaning solvents, detergents, and the like by hand, device, or other means common in the art. As indicated, due to the location, shape, and orientation of the various supports, the supports may be easily cleaned by hand or other device.

Figure 15:
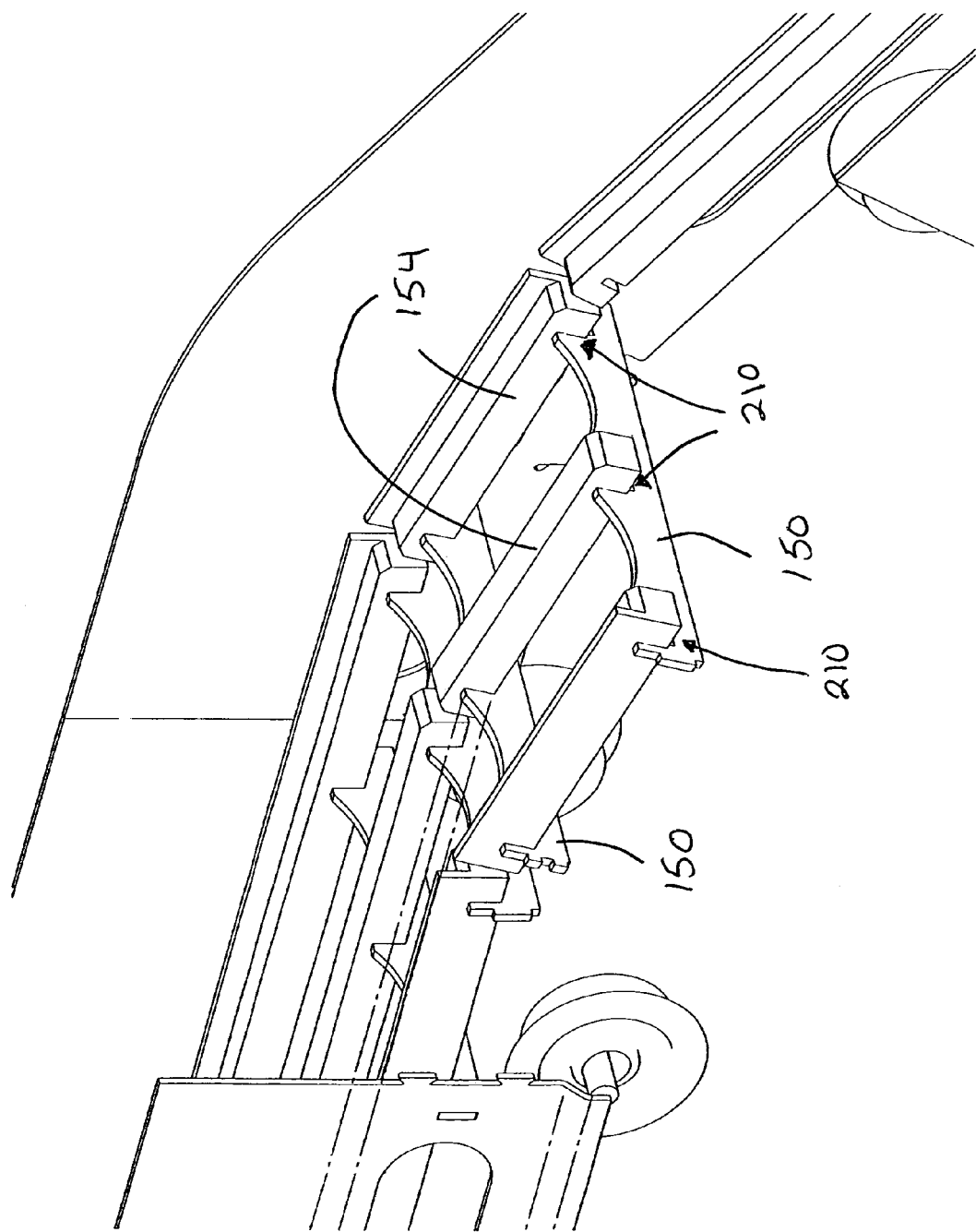
FIG. 15 is a cut-away perspective view of a incline or decline conveyor having an embodiment of the retention device of the present invention.
Figure 16:
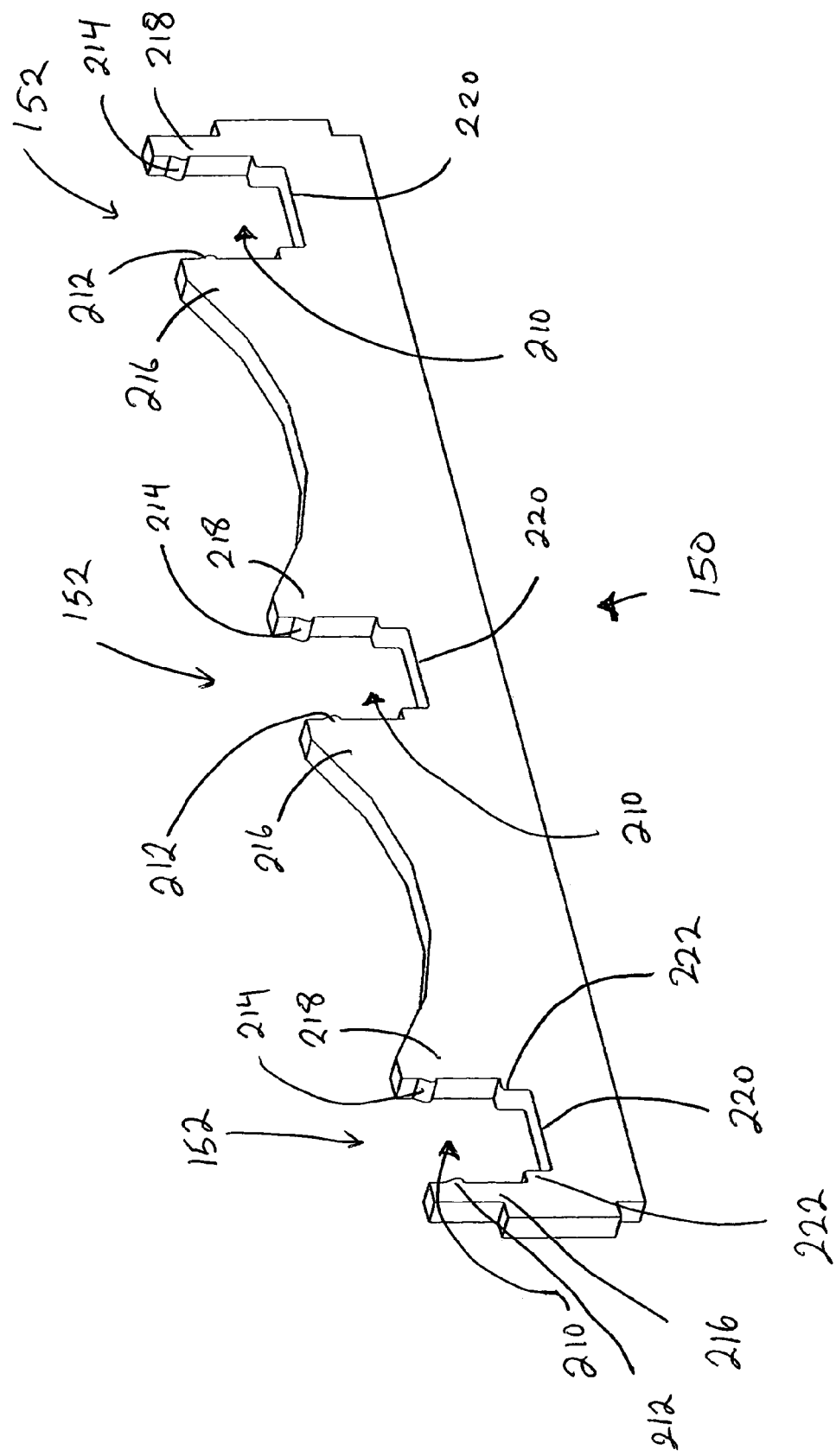
FIG. 16 is a perspective view of a cross member including an embodiment of the retention device of the present invention.

In addition to sanitary supports, as can be seen in FIGS. 1, 15, & 16, the conveyor frame 112 of the present invention may also comprise cross members 150 having grooves 152 thereon that retain, or provide positions for the placement of, wear strips 154. The cross members and corresponding components of the present invention may be provided in a conveyor assembly 110, absent the above-described sanitary supports, or in combination with same. In a preferred embodiment, the wear strips 154 comprise squared, plastic, longitudinal rods. However, other materials and shapes suitable for purposes of the present invention, such as a rectangular wear strip or a rounded wear strip and the like, or metal, rubber, and the like, may be used.

A conveyor assembly may, in some instances, contain a series of wear strips 154 placed end-to-end. Likewise, when a plurality of wear strips are needed to support a width of a conveyor bed, the wear strips 154 are spaced apart along respective cross members and run in parallel longitudinally along the length of the conveyor frame 112 (See FIG. 1).

In order to adequately clean the device, it is preferable that these wear strips 154 be removable from the conveyor assembly 110. However, the wear strips 154 must also be secured in place on the cross members 150, as oftentimes a belt or like component runs at high velocity over the top of the wear strips which may cause a wear strip that is not securely attached thereon to come loose or fall out. Likewise, radius conveyors and short conveyor runs require a means to secure the wear strips 154 in place to prevent the wear strip 154 from falling out. Typical means of fastening wear strips in currently available systems include providing a bolt that is inserted through the wear strip which connects to the frame of the conveyor. Clamps may also be used. However, as discussed herein, bolts require a hole to be drilled through the wear strip and through a component of the frame. Likewise, clamps often have a receptor to receive same. Holes and other receptors commonly collect water, bacteria, debris, and other waste and are extremely difficult to clean. Moreover, assembly and disassembly of a conveyor having bolts, clamps and the like requires time and additional components.

Even more problematic for current conveyor systems is that current radius conveyors or conveyor systems that contain a curve do not have a simple means of easily and securely attaching the wear strip. As discussed, common to such systems is a bolt that is inserted through a hole or the use of a clamp, but such means are difficult to clean. Alternatively, a wear strip may simply be placed in a groove provided therefore. Unfortunately, due to the stress placed upon the wear strip in the curve of a radius conveyor, the wear strip is prone to pop out of position. Likewise, short runs for conveyors also present a problem for retaining a wear strip as the short wear strips are often light weight and have few connection or contact points with the frame.

In view of the foregoing, the present invention provides a means for effectively and removably retaining a wear strip 154 within a cross member 150 on a conveyor frame 112. The conveyor frame may comprise a straight run, a radius conveyor, or a short conveyor run. Advantageously, the means for retaining a wear strip in an embodiment of the present invention comprises a device that permits the quick and easy attachment and removal of a wear strip 154 from the frame 112 for cleaning and other purposes, while at the same time is capable of, and does retain the wear strip 154 firmly in position on the frame 112. As indicated above, these retention devices 210 may be used on radius conveyors, straight conveyors and other shorter conveyor assemblies, although the device may be used in connection with any conveyor component that requires a secure but removable connection for purposes of the present invention. For example, FIG. 15 represents the use of same in connection with both a radius conveyor assembly, and a short assembly.

In a preferred embodiment of the present invention, a retention device 210 is provided. As seen in FIG. 16, a preferred embodiment of the cross member 150 of the present invention is provided containing grooves 152 with one or more retention devices 210 thereon. In the embodiment shown, three retention devices 210 are provided. However, additional or fewer retention devices 210 may be used to suit the conveyor's purposes without departing from the overall scope of the present invention. Likewise, one or more retention devices 210 may be used in combination with one or more grooves 152 not having means for retaining the wear strip 154 either on the same cross member 150 or on separate cross members. An example of a groove 152 not having means for retaining the wear strip 154 may comprise a groove of a shape that mates with the wear strip, such as, but not limited to, square cut-outs that correspond to squared rods used as wear strips (see FIG. 17). It is understood that one of skill in the art could make variations on the examples given to form different shapes and engagements without departing from the overall scope of the present invention.

Figure 17:
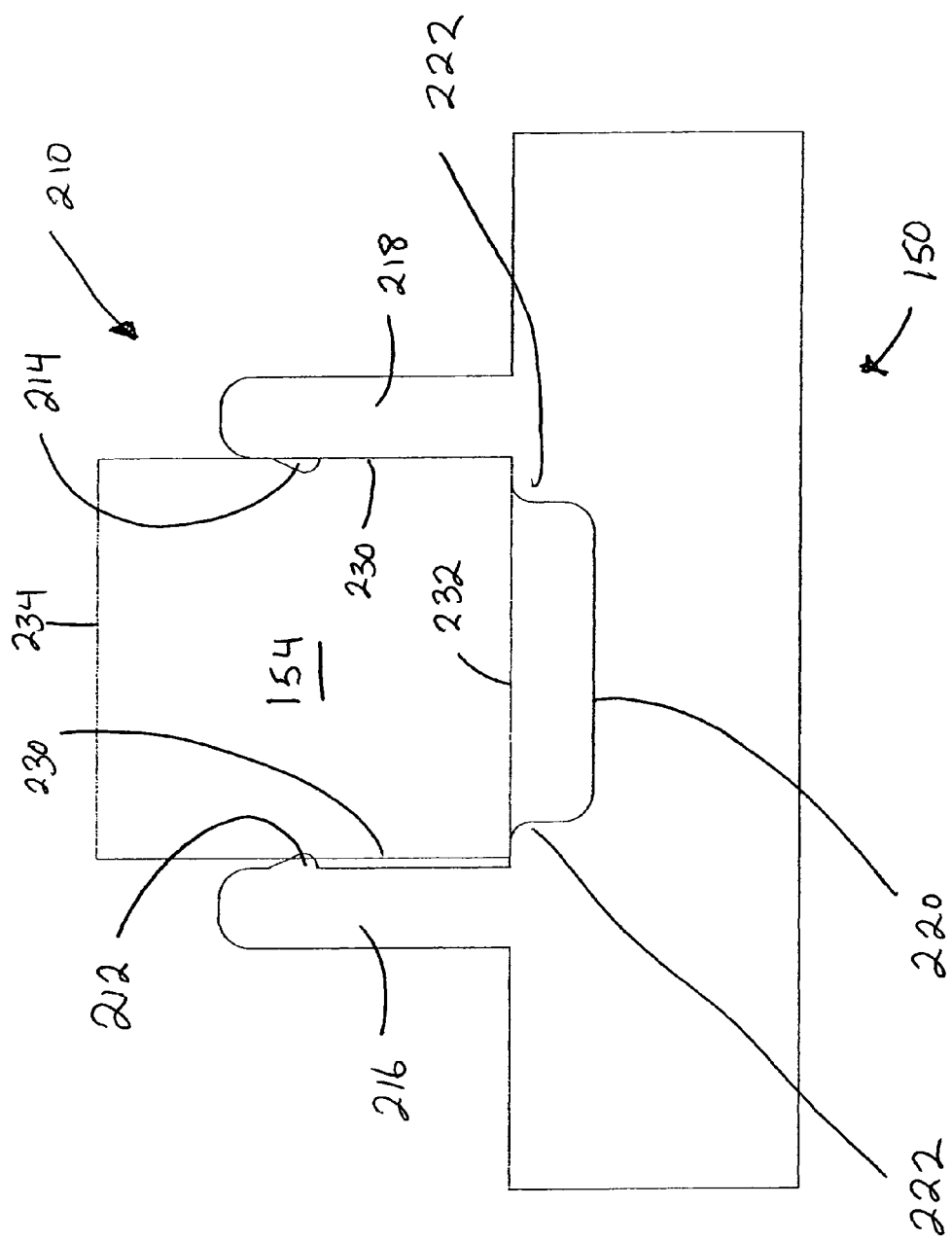
FIG. 17 is an elevational view of the retention device of FIG. 16.
Figure 18:
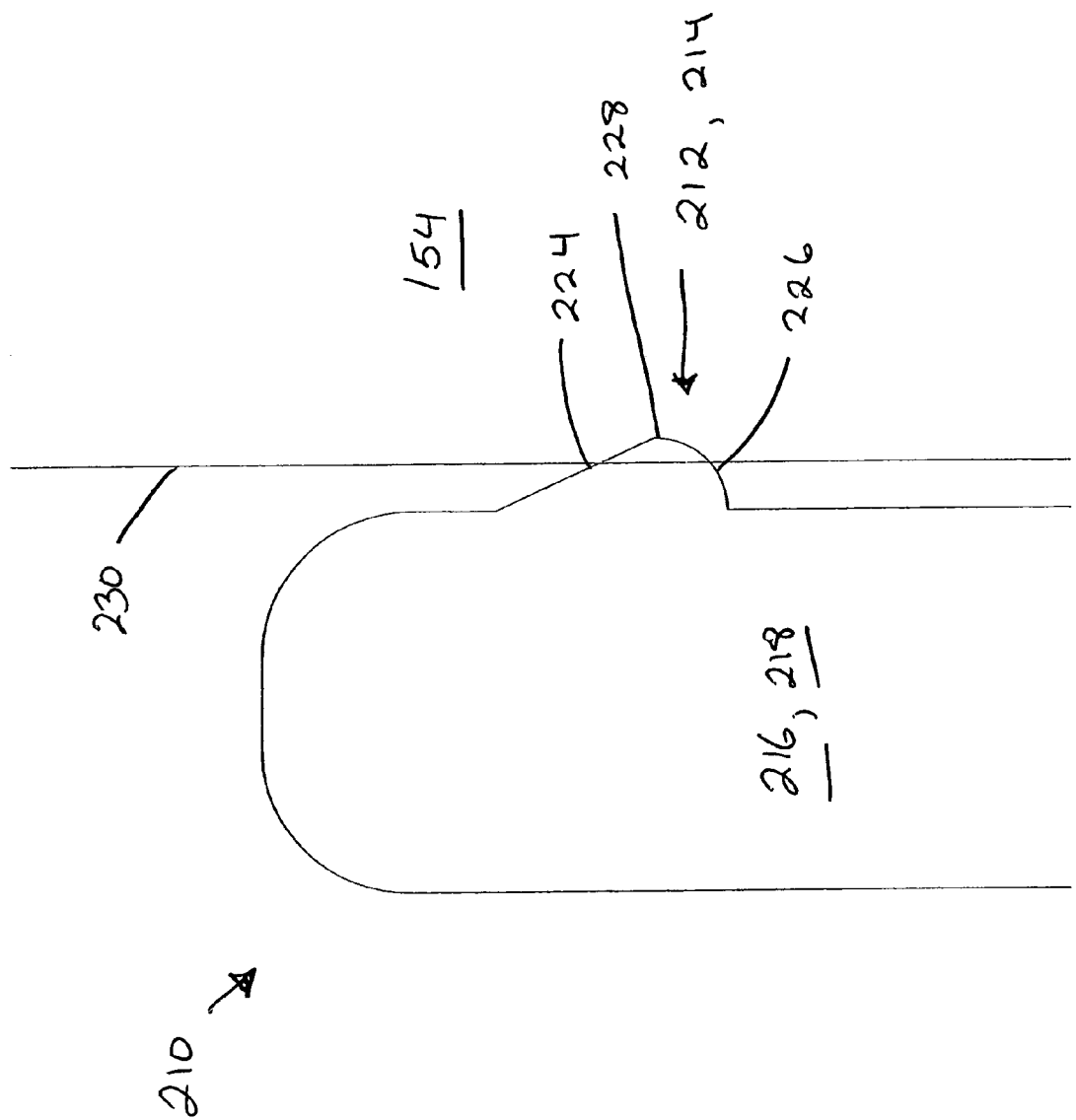
FIG. 18 is an elevational view of a portion of the retention device of FIGS. 16 and 17 having an embodiment of a smoothed protrusion of the present invention.

In further detail, as can be seen from FIGS. 16-18, the retention device 210 is provided within, or as a portion of, groove 152. The retention device 210 comprises a first smoothed protrusion 212 and a second smoothed protrusion 214. More specifically, referring to FIGS. 16 & 17, the groove 152 comprises a first wall 216, a second wall 218 and a base wall 220. The wear strip 154 may be supported by the base wall 220 between the first wall 216 and the second wall 218. While not required, the base wall 220 may comprise raised corners 222 or rounded corners which support the wear strip 154 a distance above the base wall 220 and provide a space thereunder when the wear strip is attached for cleaning below the wear strip (See FIG. 17).

Preferably, the first and second smoothed protrusions 212, 214 are attached, integrally, or as separate components, to the first wall 216 and the second wall 218, respectively, of the groove at a position spaced from the base wall 220. More preferably, the first smoothed protrusion 212 is positioned near the end of the first wall 216 opposite the base wall 220. Likewise, the second smoothed protrusion 214 is positioned near the end of the second wall 218 opposite the base wall 220 and preferably in a location that corresponds with the position of the first smoothed protrusion 214. Referring to FIGS. 17-18, the first and second smoothed protrusions 212, 214 each comprise a first slope 224 extending downwardly toward the base wall 220 and outwardly toward the center of the groove 152, beginning at the wall 216 or 218 and terminating in a curve 228 a distance (and preferably a short distance) from the wall 216 or 218. The protrusions 212, 214 further comprise a second slope 226 that returns to the wall from the curve 228 at a steeper angle from the first slope 224 or curve 228 inwardly toward the wall 216 or 218 and slightly downward toward the base wall 220, terminating at the wall 216 or 218. The combination of the first and second slopes 224, 226 and corresponding curve 228 form a partial "tear-drop" shape (see FIG. 18). While a specific shape is described, one of skill in the art would understand that variations in the shape, angles, distances, and walls are acceptable for purposes of the present invention.

Referring to FIGS. 16 & 17, the shape of the protrusions 212, 214 and their location on the first and second walls 216, 218 preferably provide for the secure attachment of the wear strip 154 within the groove 152. Namely, the wear strip 154 is inserted into the groove 152. The lower end of the wear strip 154, and preferably the corners of a squared wear strip 154, contact the first smoothed protrusion 212 and second smoothed protrusion 214 simultaneously. Pressure and/or force is applied to the wear strip 154, by either pressing down upon the wear strip or using a device such as a hammer to apply such force. As pressure or force is applied, the lower edges of the wear strip slide along the first slope 224 of the first and second smoothed protrusions 212, 214 and over the curve 228 at the end of the slope 224. As the wear strip 154 continues to be forced into the groove 152, at least a portion of the wear strip continues to be in contact with, or slides across the first and second smoothed protrusions 212, 214 simultaneously. The wear strip 154 may be retained in position by the contact of the protrusion 212, 214 with the sides 230 of the wear strip 154 and the pressure thereon caused by the tight fit between the wear strip 154 and the smoothed protrusions 212, 214 (see FIG. 17).

As alluded to herein, preferably, the wear strip 154 comprises a slightly malleable or slightly flexible material, such as plastic, malleable metal, rubber and the like to accommodate the tight connection between the protrusions 212, 214 and the wear strip 154. Alternatively, the groove 152 or cross member 150 may comprise a slightly malleable or flexible material where a rigid wear strip 154 is used. These materials may be formed by any means common in the art for constructing the respective components, including but not limited to, extrusion, mold, laser cut, and the like.

In the position provided, discussed above and disclosed in FIGS. 16 & 17, the bottom 232 of the wear strip may be in contact with the base wall 220 or raised corners 222 if present thereon. In an alternative embodiment, a deeper groove 152 may be used, in which case once the top 234 of the wear strip 154 has cleared the curve 228 of the first and second smoothed protrusions 212, 214, the bottom of the wear strip 154 is simultaneously placed in contact with the base wall 220, or a portion thereof, such as the raised corners 222 in one embodiment. Due to the steeper second slope 226 and the distance that the first and second smoothed protrusions 212, 214 extend inwardly into the center of the groove 152, the wear strip 154 is retained in position within the groove 152.

Moreover, in either embodiment, as the second slope 226 comprises a slight angle, as described above, and the protrusions 212, 214 are curved or smoothed, it is possible to remove the wear strip 154 from the groove 152 by the application of the force in the opposite direction, and preferably a greater force than required to insert the wear strip into the groove. Further, considering that the first and second smoothed protrusions 212, 214 comprise smooth surfaces, the wear strip 154 can be inserted into and removed from the groove 152 repeatedly for assembly and disassembly, as well as for cleaning without damage to the wear strip 154. Not only is the wear strip 154 easily removed without damage, but the wear strip 154 is securely attached to, and will not be easily removed from, the cross member 150 when inserted in the retention device 210. As a result, bolts, screws, clamps and the like, or other means for attachment are not necessary to retain the wear strips on the conveyor assembly 110.

While a specific position of the first and second protrusions 212, 214 is disclosed, one of skill in the art would understand that modifications to these positions would not depart from the overall scope of the present invention.

Briefly, a method of attaching a wear strip 154 according to the present invention comprises the following steps. A cross member 150 is provided on a conveyor frame 112 having at least one retention device 210. A wear strip 154 is also provided which is capable of mating with the retention device 210 on the cross member. The wear strip 154 is aligned with the retention device 210 and pressure is applied, either by pressing upon the wear strip 154, or the use of a hammer and the like, forcing the wear strip into the retention device 210 until the wear strip 154 contacts a portion of the base wall 220 of the retention device 210. The wear strip 154 is retained in position in the retention device 210 by the pressure applied against the wear strip by the first and second smoothed protrusions 212, 214. Removal of the wear strip is accomplished by applying pressure in the opposite direction until the wear strip 154 clears the protrusions 212, 214 and is freed from the retention device, thereby allowing removal of the wear strip 154 for cleaning, maintenance, and/or replacement.

In combination with the conveyor assembly components discussed hereinabove which facilitate the easy cleaning, and/or assembly, disassembly and overall maintenance of a conveyor, or as a separate device, a sanitary removable hinge 310 is provided. Currently available hinges such as piano-type hinges and door-type hinges consist of many crevices and inaccessible components which serve to collect water, bacteria and other contaminants, providing unsanitary connections between the respective components. Furthermore, currently available hinges are difficult to assemble and disassemble without significant work. To avoid the problems associated with current hinge systems, as shown in FIGS. 19-23, a sanitary removable hinge 310 may be provided for use with a conveyor assembly. The sanitary removable hinge 310 facilitates the easy assembly/disassembly of hinged conveyor components on the conveyor system and the cleaning thereof. The hinge 310 may be comprise metal, plastic, rubber, or the like, or any combination thereof. Likewise, the hinge 310 may be formed by extrusion, mold, weld, laser cut, or any means common in the art for constructing same.

The sanitary removable hinge 310 may be used for any hinged connection necessary in the conveyor assembly 110. In the embodiment shown, the hinge 310 is used in combination with a cover assembly 338 for a drive 118 or drive motor 120. Namely, the sanitary removable hinge 310 assists in providing a pivotal, moveable door or conveyor component 316 that allows access into a cover assembly 338 which protects or encloses a drive assembly 118 or drive motor 120 for the conveyor assembly 110 and which is attached thereto. The use of the sanitary removable hinge 310 in connection with a cover 338 for a drive assembly 118 is provided merely by way of example only and, as indicated above, the sanitary removable hinge 310 may be applied to any hinged components on the conveyor.

In a preferred embodiment, one or more sanitary removable hinges 310 are provided to form a hinged connection between two or more components. In the embodiment shown in FIG. 20, two hinges 310 are provided on each side of the cover assembly 338. The sanitary removable hinge 310 comprises a hinge member 312 having a first surface 314 in contact with a movable conveyor component 316, and preferably securely attached thereto, and a pin receptor section 318 spaced apart from the first surface 314. The pin receptor section 318 comprises a radius portion 320 and a flat portion 322 adjacent to or in combination with a slot 321. The flat portion 322 and slot 321 are integrally connected with the radius portion.

Figure 21:
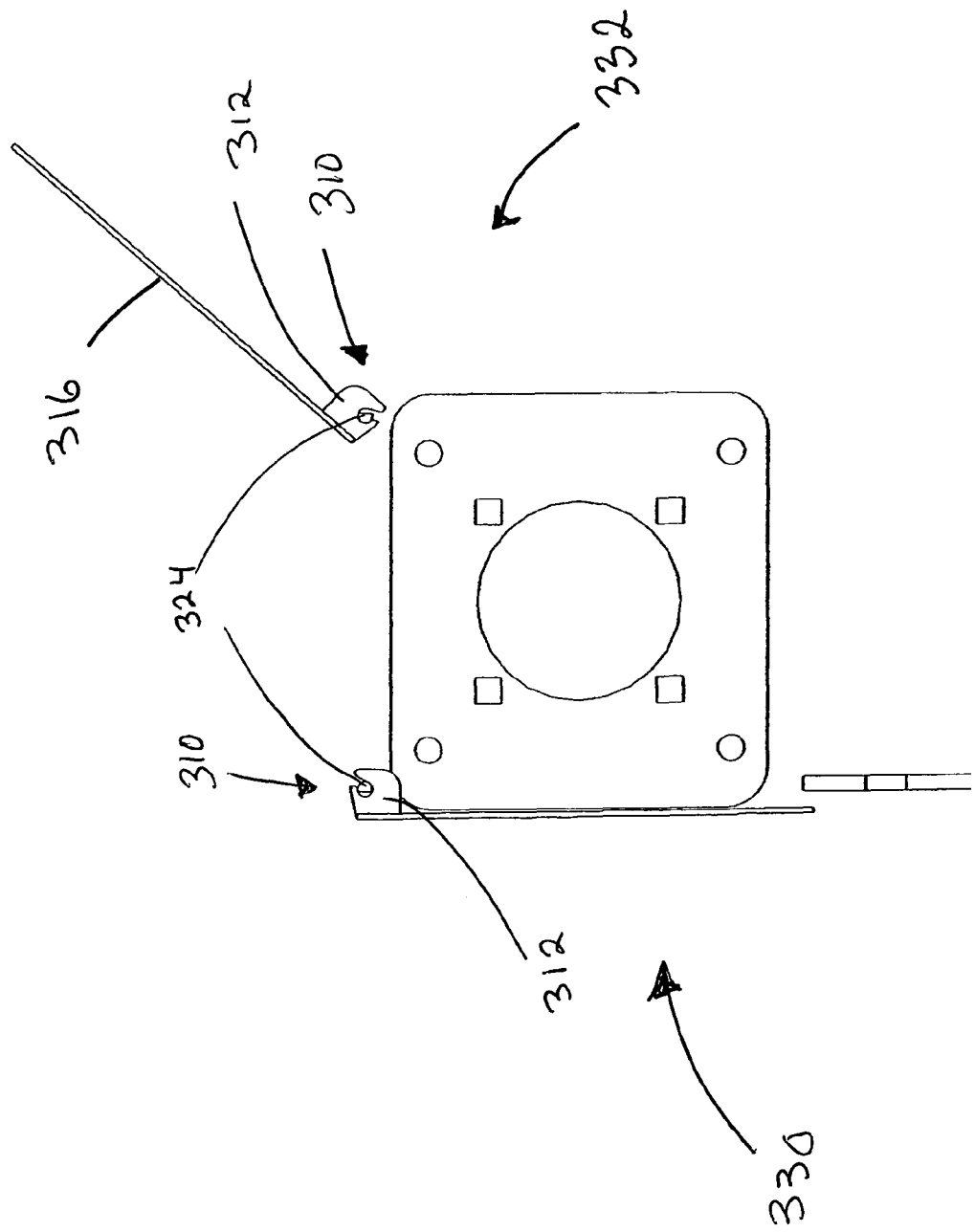
FIG. 21 is a cut-away side elevational view of a sanitary removeable hinge of the present invention.
Figure 23:
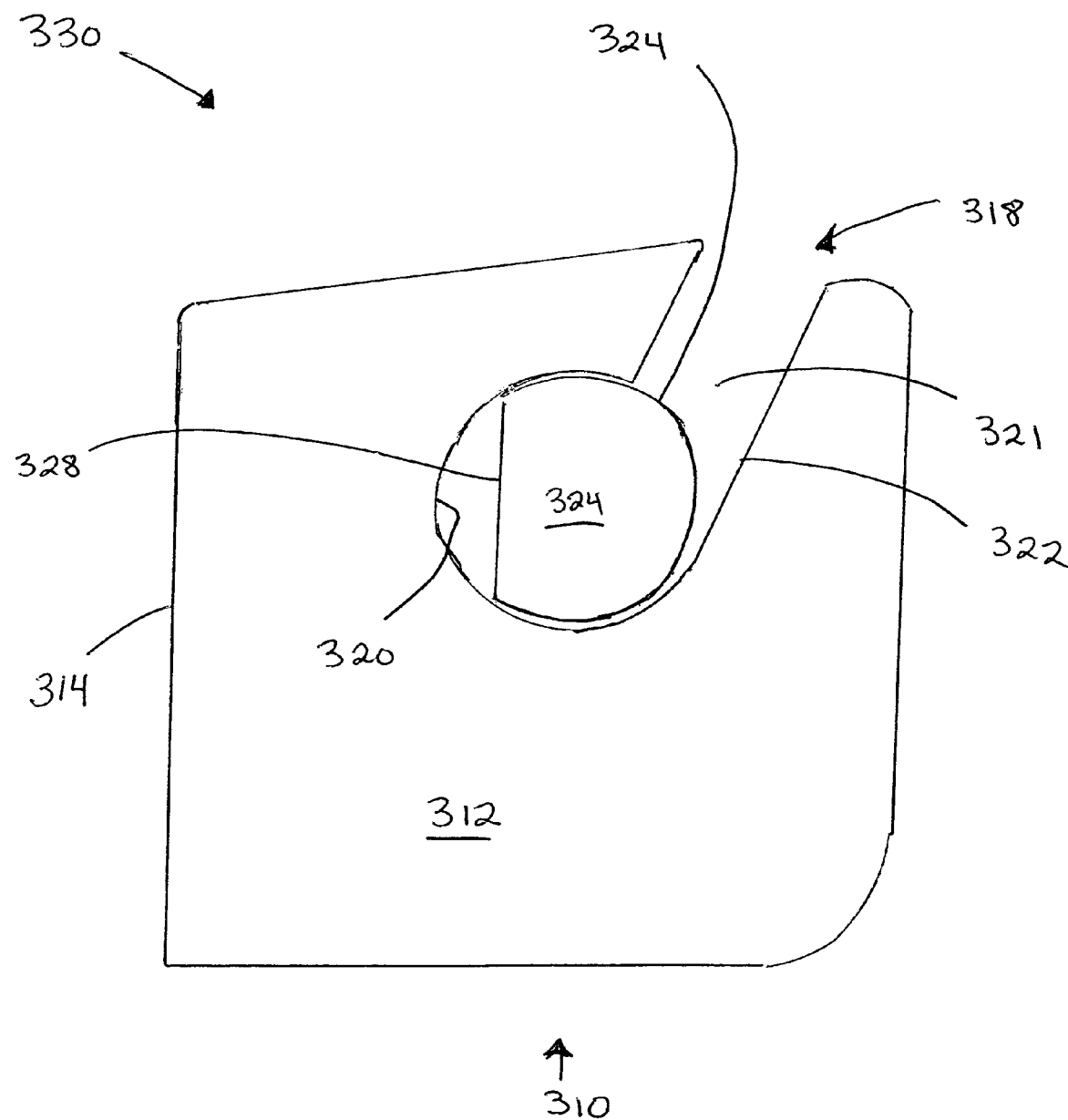
FIG. 23 is an elevational view of a sanitary hinge member showing only the hinge member and pin of FIGS. 19-22.

A pin 324 is also provided. The pin 324, likewise, comprises a radius portion 326 and a flat portion 328. When in use, the pin 324 extends substantially perpendicular to the hinge member 312. Preferably, the pin 324 is received within the pin receptor section 318 of the hinge member 312. As can be seen in FIGS. 21 & 23, the flat portion 328 of the pin 324 is positioned so that, when the sanitary removable hinge 310 is rotated into its closed position 330, the flat portion 328 faces at least a portion of the radius 320 of the pin receptor section 318. Further, the pin 324 has a shape which permits rotation of the hinge member 312 about the pin 324, namely, the radius portion 326 of the pin, but is incompatible with the flat portion 322 of the pin receptor section 318 unless the hinge member 312 and pin 324 are specifically aligned in a particular orientation. For instance, the diameter of the radius portion 326 of the pin 324 may be wider than the slot 321 provided in the pin receptor section 318. As a result, unless the flat portion of the pin 328 is aligned with the corresponding portion 322 on the hinge member 312, the hinge member 312 will not slide off from the pin 324. Due to the incompatible shape of the pin and its position, the pin is unable to slide out of the pin receptor section 318, thus retaining the hinge member 312 in position on the pin 324. On the other hand, when a sanitary removable hinge 310 is rotated to the open position 332, the flat portion 328 of the pin 324 aligns with the flat portion 322 of the pin receptor section 318 on the hinge member 312 and is capable of sliding thereon. As a result, the hinge member 312 may slide off of the pin 324, resulting in removal of the hinge member 312 from the pin 324 and removal of any corresponding attached movable conveyor component 316 from the conveyor assembly 110.

Figure 19:
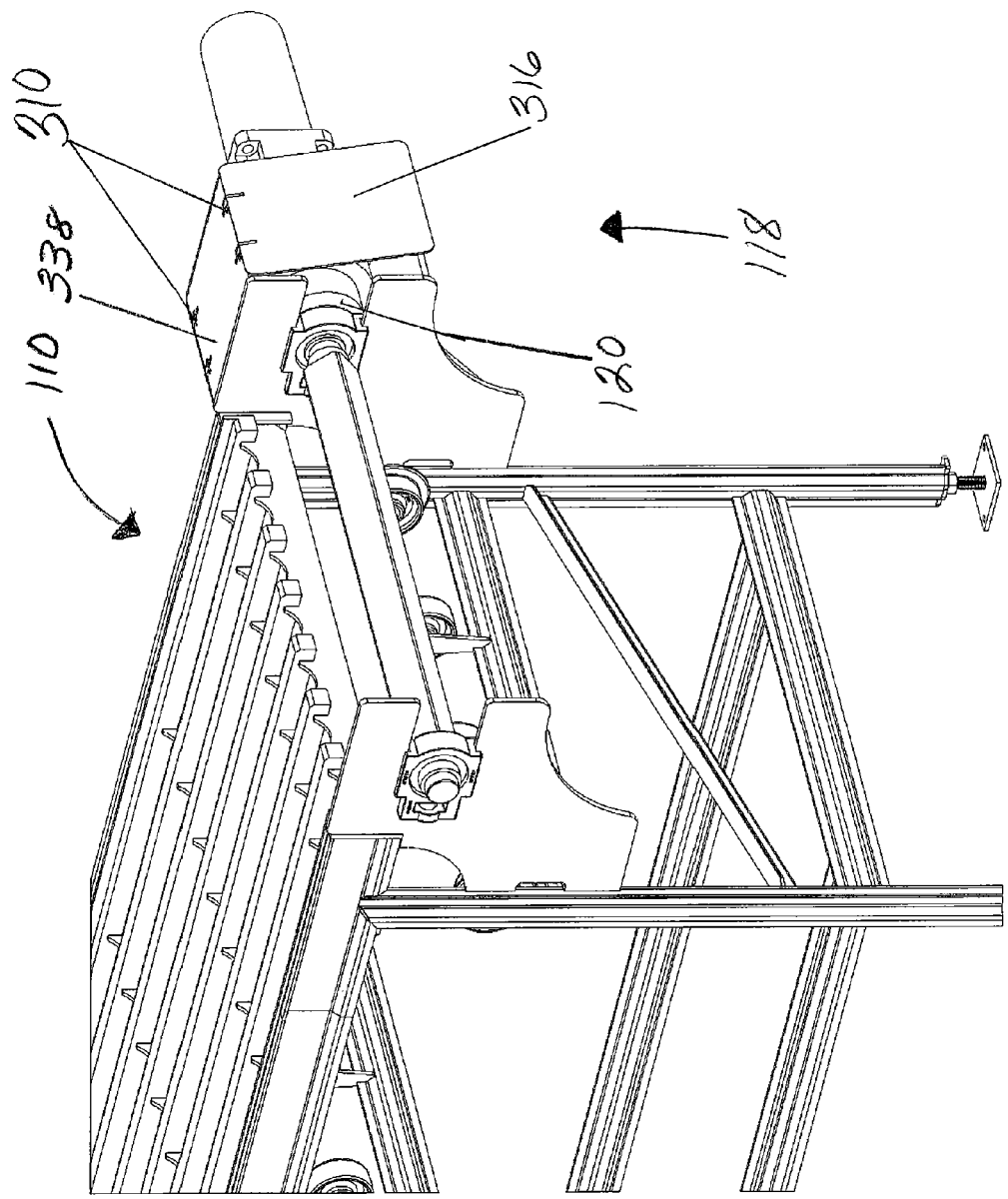
FIG. 19 is a cut-away perspective view of a conveyor assembly having a sanitary removeable hinge of the present invention.
Figure 20:
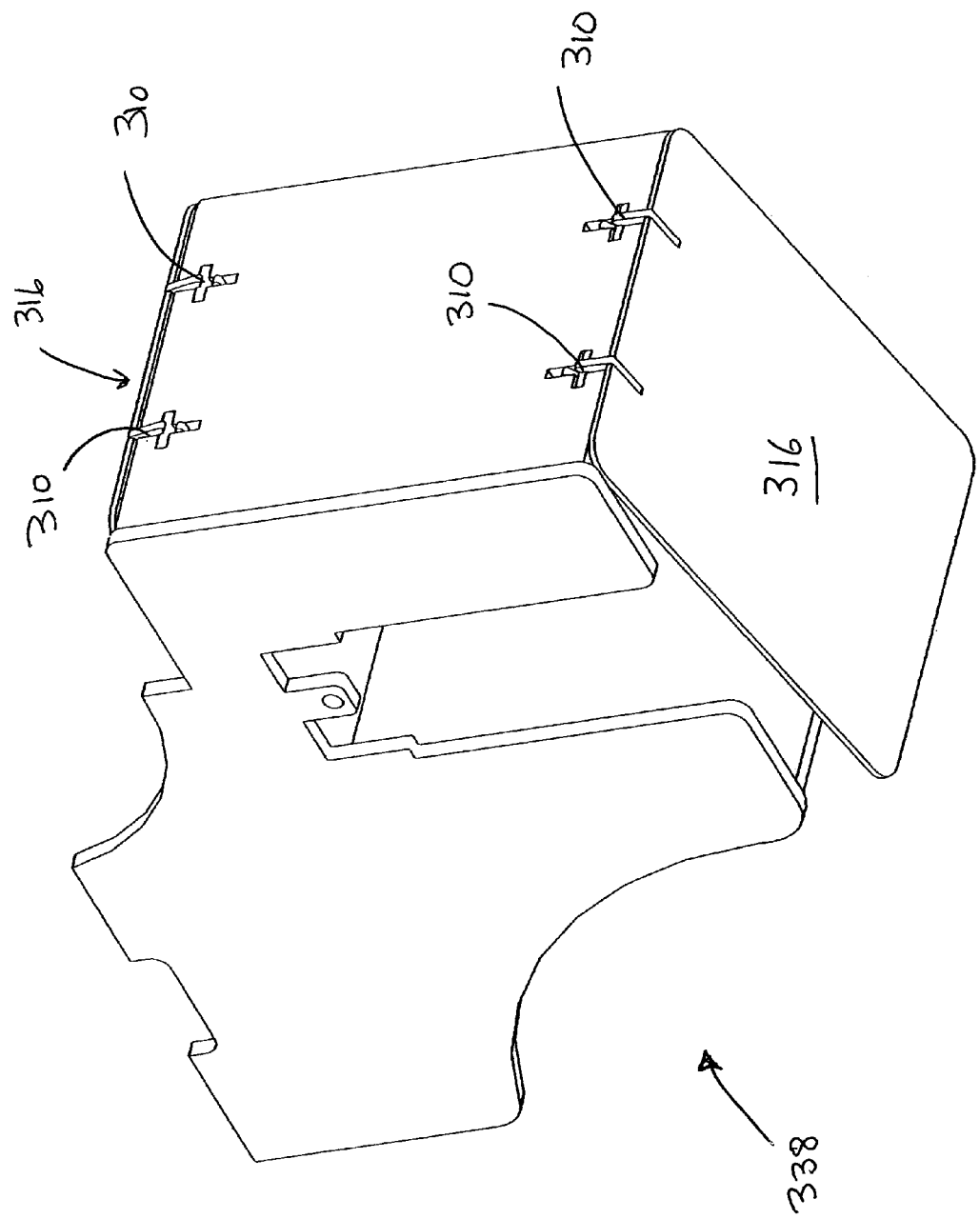
FIG. 20 is a perspective view of a conveyor component having the sanitary removeable hinge of the present invention.
Figure 22:
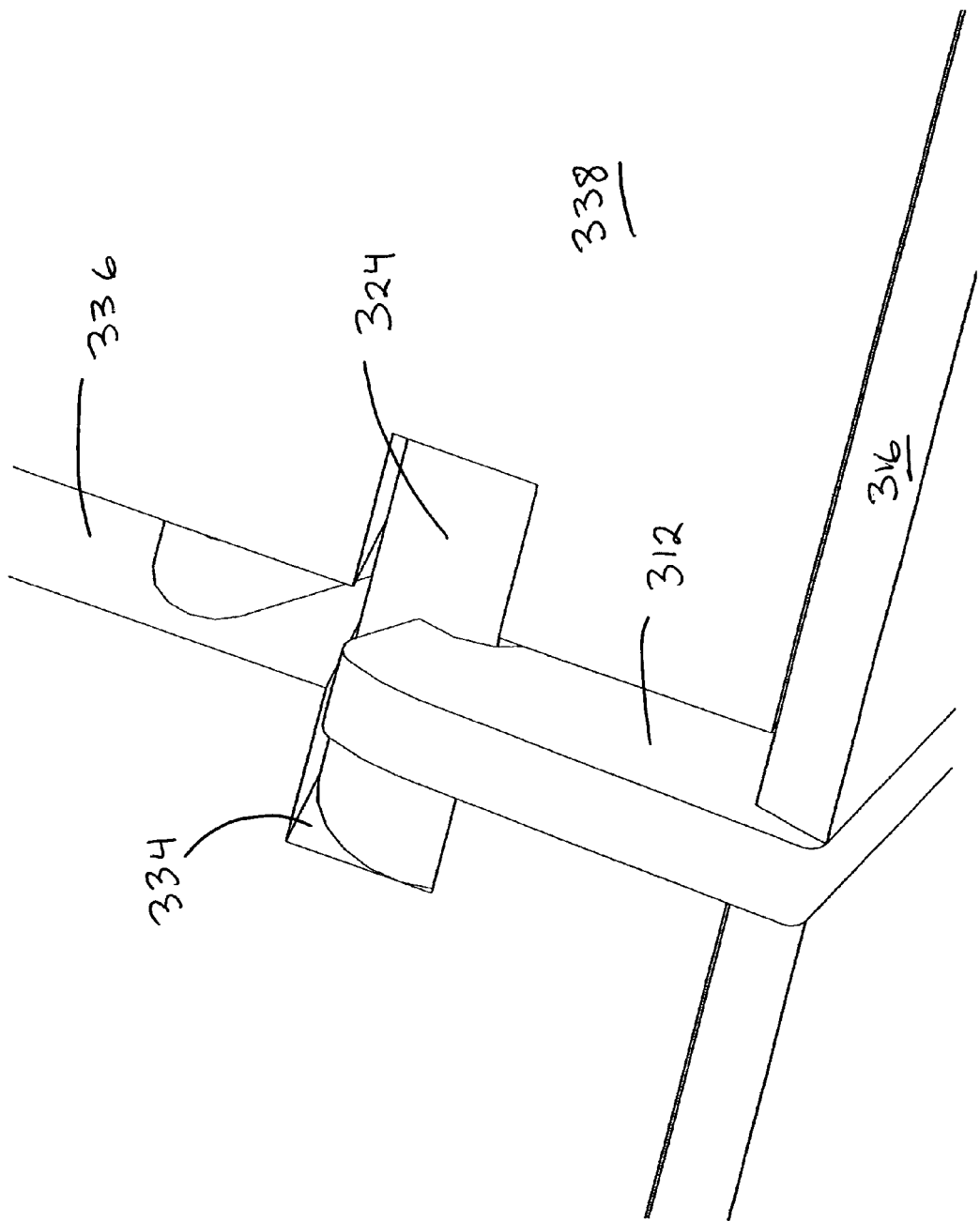
FIG. 22 is a cut-away perspective view of the sanitary removeable hinge of the present invention.

In a preferred embodiment, the pin 324 may be provided in a slot 334 within a portion of the conveyor assembly 110, such as a wall thereof as shown in FIGS. 19-20 & 22. Likewise, a slot 336 for the hinge member 312 perpendicular to the pin slot 334 may be provided for the movable engagement of the hinge member 312 with the pin 324. The pin 324 may be an integral component of the conveyor component in which it is placed, or may be a separate element fastened thereto by means known in the art. Likewise, the first surface 314, which is in contact with the movable conveyor component 316, may be integrally attached to the movable conveyor component 316 or a separate component attached by means known in the art. As a result of this removable hinge 310, the hinge assembly may be disassembled and any movable attached components can be easily removed for cleaning, maintenance, or other relevant needs.

In view of the foregoing, a method of disassembly and assembly of conveyor components in operable connection to the sanitary removable hinge comprises the following steps. To disassemble the sanitary removable hinge 310 from the conveyor assembly 110, the movable conveyor component 316, which exists in its closed position 330, is grasped and rotated to its open position 332. The rotation of the movable conveyor component 316 causes the hinge member 312 to rotate about the pin 324 in the slot 336 provided therefore. In further detail, the radius portion 320 of the pin receptor section 318 on the hinge member 312 rotates over the radius portion 326 of the pin 324. In the open position 332, the flat portion 322 of the pin receptor section 318 is aligned with the flat portion 328 of the pin 324, allowing the pin 324 to clear the slot 321 in the pin receptor section of the hinge member 312. As the movable conveyor component 316 in the open position 332 is pulled away from the conveyor assembly or respective conveyor component, the flat portion 322 of the hinge member 312 slides along the flat portion 328 of the pin 324 until it is completely removed from the pin. Once complete removal of the hinge member 312 from the pin 324 is achieved, the movable conveyor component is separated from the conveyor assembly and the respective components can be cleaned, or other maintenance performed.

Conversely, to reattach the hinge member 312 and attached movable conveyor component 316, the flat portion 322 of the pin receptor section 318 on the hinge member 312 is aligned with the flat portion 328 of the pin 324. The component 316 is then moved forward, sliding the flat portion 322 of the hinge member 312 across the flat portion 328 of the pin 324, until the pin 324 is completely received within the pin receptor section 318, at which point the movable conveyor component 316 and attached hinge member 312 may be rotated to the closed position 330, thereby retaining the pin 324 within the pin receptor section 318 as described above.

The various mechanisms for the sanitary conveyor assembly and its components or the application of same disclosed herein may be combined in numerous combinations, and the invention should not be limited to the particular combinations described and illustrated herein. For example, it is contemplated that one or more conveyor support components 162, 174, and 184 may be used individually or interchangeably. Likewise, it would be obvious to modify the conveyor assembly to attach additional angles, walls, components located in various positions or orientations without departing from the scope of the present invention.

Presently preferred embodiments of the invention and many of its improvements have been described with a degree of particularity. The previous description is of preferred examples for implementing the invention, and the scope of the invention should not necessarily be limited by this description. Although various representative embodiments of this invention have been described above with a certain degree of particularity, those skilled in the art could make numerous alterations to the disclosed embodiments without departing from the spirit or scope of the inventive subject matter set forth in the specification and claims. All directional references (e.g., upper, lower, upward, downward, left, right, leftward, rightward, top, bottom, above, below, vertical, horizontal, angled, and so forth) are only used for identification purposes to aid the reader's understanding of the embodiments of the present invention, and do not create limitations, particularly as to the position, orientation, or use of the invention unless specifically set forth in the claims. Joinder references (e.g., attached, coupled, connected, and the like) are to be construed broadly and may include intermediate members between a connection of elements and relative movement between elements. As such, joinder references do not necessarily infer that two elements are directly connected and in fixed relation to each other.

In some instances, components are described with reference to "ends" having a particular characteristic and/or being connected with another part. However, those skilled in the art will recognize that the present invention is not limited to components which terminate immediately beyond their points of connection with other parts. Thus, the term "end" should be interpreted broadly, in a manner that includes areas adjacent, rearward, forward of, or otherwise near the terminus of a particular element, link, component, part, member or the like. In methodologies directly or indirectly set forth herein, various steps and operations are described in one possible order of operation, but those skilled in the art will recognize that steps and operations may be rearranged, replaced, or eliminated without necessarily departing from the spirit and scope of the present invention. It is intended that all matter contained in the above description or shown in the accompanying drawings shall be interpreted as illustrative only and not limiting. Changes in detail or structure may be made without departing from the spirit of the invention as defined in the appended claims.

What is claimed is:

1. A conveyor assembly having a frame comprising substantially parallel longitudinal rails carried by vertical supports and extending longitudinally in a conveying direction, a cross member forming a carryway support carried in a position between the longitudinal rails and supporting a conveyor bed, each longitudinal rail having a first side surface and a second side surface, the longitudinal rail having a channel open on the first side surface and a segment integrally attached to the channel and extending at an angle greater than ninety degrees from the channel forming an accessible side surface for easy cleaning, the longitudinal rail further having minimal surface area for collection of water, waste, bacteria, debris, and mold, and arranged on said frame to reduce the collection of water, waste, bacteria, debris, and mold.

2. The conveyor assembly of claim 1, wherein the frame support has at least one vertical support, the vertical support having a first side surface and a second side surface extending from a first end of the vertical support to a second end of the vertical support, the vertical support forming minimal surface area for collection of water, waste, bacteria, debris, and mold, and at least one of the first and second side surfaces having a channel accessible from said side surface for easy cleaning, said vertical support further comprising an orientation on said frame that reduces the collection of water, waste, bacteria, debris, and mold.

3. The conveyor assembly of claim 2, wherein the frame support has at least one lower longitudinal support, the lower longitudinal support having a first side surface and a second side surface, the lower longitudinal support forming minimal surface area for collection of water, waste, bacteria, debris, and mold, and at least one of the first and second side surfaces having a channel accessible from said side surface for easy cleaning, said lower longitudinal support further comprising an orientation on said frame that reduces the collection of water, waste, bacteria, debris, and mold.

4. The conveyor assembly of claim 1, wherein said frame support further comprises a workstation support.

5. The conveyor assembly of claim 1, wherein said frame support further comprises a roller support.

6. The conveyor assembly of claim 1, wherein a plurality of said supports are provided in integral, operable connection forming said frame with minimal surface area for collection of water, waste, bacteria, debris, and mold, and which are accessible for easy cleaning, said supports further comprising positions on said frame that reduce the collection of water, waste, bacteria, debris, and mold.

7. The conveyor assembly of claim 1, further comprising a retention device for removably retaining a wear strip operably attached to said frame support on said frame, said retention device comprising:
   a first substantially flat wall having a first smoothed protrusion;
   a second substantially flat wall having a second smoothed protrusion opposite said first substantially flat wall and first smoothed protrusion, said first and second smoothed protrusions capable of applying a simultaneous force against the wear strip for removable retention of the wear strip; and
   an upward-facing opening between the first and second substantially flat walls for receipt of the wear strip.

8. The conveyor assembly of claim 7, further comprising a sanitary removable hinge for the removable connection of a hinged component on the conveyor assembly.

9. The conveyor assembly of claim 1, further comprising a sanitary removable hinge for the removable connection of a hinged component on the conveyor assembly.

10. The conveyor assembly of claim 1, wherein the first side surface of the longitudinal rail faces away from the cross member, and the second side surface of the longitudinal rail faces the cross member.

11. A conveyor assembly having a sanitary removable hinge, the sanitary removable hinge comprising:
   a hinge member having a first surface in contact with a movable conveyor component, the hinge member also having a pin receptor section spaced from the first surface, said pin receptor section including an opening formed by a flat portion and slot extending to a radius portion; and
   a pin carried by and extending from a second conveyor component and removably received in the pin receptor section, the pin including a radius portion and flat portion adapted to mate with the pin receptor section, the second conveyor component and pin carried thereby being separable from the hinge member to enable separation of the second conveyor component from the movable conveyor component, wherein said pin is adapted to be engaged and disengaged with said pin receptor section by rotating said moveable conveyor component carrying the hinge member so that said flat portion of said pin is aligned with said flat portion of said pin receptor section enabling insertion and removal of said pin from said pin receptor section through the slot.

12. The conveyor assembly of claim 11, further comprising a plurality of sanitary removable hinges.

13. A conveyor assembly comprising:
   a frame having a support for a conveyor bed, the support comprising at least one of a side panel and a vertical support, said support further comprising a minimal surface area for collection of water, waste, bacteria, debris, and mold, and a channel accessible from a side surface of the frame support for easy cleaning, said support further comprising an orientation on said frame that reduces the collection of water, waste, bacteria, debris, and mold;
   at least one retention device having a first substantially flat wall having a first smoothed protrusion, a second substantially flat wall having a second smoothed protrusions opposite said first substantially flat wall and first smoothed protrusion, and an upward-facing opening between the first and second substantially flat walls, said first and second smoothed protrusions capable of applying a simultaneous force against the wear strip for removable retention of the wear strip for the retention of a wear strip on said frame;
   the bed supported by said frame, for supporting items to be conveyed;
   at least one of a drive, a pulley, and a roller for moving said items on said conveyor assembly; and
   at least one sanitary removable hinge for the removable retention of a hinged member on said conveyor assembly;
   whereby said conveyor assembly may be easily disassembled and assembled and is capable of being easily cleaned.

14. A conveyor assembly comprising a plurality of supports, wherein the assembly comprises:
   a conveyor frame for support of a conveyor bed, the conveyor frame including a plurality of supports;
   said plurality of supports including a longitudinal rail and a vertical support;
   at least one of the plurality of supports comprising:
      a first section extending in a first plane;
      a second section integrally connected to the first section and positioned at a first angle from the first section;
      a third section integrally connected to the second section and positioned at a second angle from the second section so that the third section is in a second plane substantially parallel to the first plane;
      a fourth section integrally connected to the third section and positioned at a third angle from the third section opposite the second angle; and
      a fifth section integrally attached to the fourth section and positioned at a fourth angle from the fourth section so that the fifth section is substantially in the first plane, wherein the first section, second section, third section, fourth section, and fifth section form a support having an open channel, the open channel being accessible from a longitudinal side surface when said support is positioned on said frame for operation.

15. The conveyor assembly as described in claim 14 wherein the first angle, second angle, third angle, and fourth angle of the at least one support are rounded to form a substantially smooth surface.

16. A conveyor assembly comprising a plurality of supports, wherein the assembly comprises:

a conveyor frame for support of a conveyor bed, the conveyor frame including plurality of supports;
said plurality of supports including at least one of a side panel and a vertical support;
at least one of the plurality of supports comprising:
a first section extending in a first plane;
a second section integrally connected with the first section and positioned at a first angle from the first section;
a third section integrally attached to the second section and positioned at a second angle from the second section so that the third section is in a second plane substantially parallel to the first plane; and
a fourth section integrally attached to the third section and positioned at a third angle wherein the third angle is an approximate right angle extending from the third section, wherein the first section, second section, third section, and fourth section form a support having an open channel, the open channel being accessible from a longitudinal side surface when said support is positioned on said frame for operation.

17. The conveyor assembly as described in claim 16 wherein the first angle, second angle, and third angle of the at least one support are rounded to form a substantially smooth surface.

18. The conveyor assembly as described in claim 16 wherein the third section of the at least one support is wider than the first section.

19. A conveyor assembly comprising a plurality of supports, wherein the assembly comprises:
a conveyor frame for support of a conveyor bed, the conveyor frame including plurality of supports;
said plurality of supports including at least one of a side panel and a vertical support;
at least one support comprising:
a first section;
a second section integrally attached to the first section and positioned at a first angle from the first section;
a third section integrally attached to the second section and positioned at a second angle from the second section; and
a fourth section integrally attached to the third section and positioned at a third angle from the third section opposite to the first angle so that the first section and the fourth section are positioned in substantially the same plane, wherein the first section, second section, third section, and fourth section form a support having a centralized channel.

20. The conveyor assembly as described in claim 19 wherein the first angle, second angle, and third angle of the at least one support are rounded to form a substantially smooth surface.

21. A conveyor assembly having a frame comprising substantially parallel longitudinal rails carried by vertical supports and extending longitudinally in a conveying direction, a cross member forming a carryway support carried in a position between the longitudinal rails and supporting a conveyor bed, the frame having a lower frame support, the lower frame support being a longitudinal rail spaced from the carryway support having a channel open on a first side surface and a segment integrally attached to the channel and extending at an angle greater than ninety degrees from the channel which forms an accessible side surface for easy cleaning, the lower frame support having minimal surface area for collection of water, waste, bacteria, debris, and mold, and arranged on said frame to reduce the collection of water, waste, bacteria, debris, and mold.

22. The conveyor assembly of claim 21, wherein the lower frame support includes at least one of a vertical support and a lower longitudinal support.

23. The conveyor assembly of claim 21, wherein the lower frame support is a horizontal support parallel to the substantially parallel longitudinal rails.

\* \* \* \* \*